(12) United States Patent
Araki

(10) Patent No.: US 10,965,481 B2
(45) Date of Patent: Mar. 30, 2021

(54) INFORMATION PROCESSING DEVICE, INFORMATION PROCESSING SYSTEM, ELECTRONIC WHITEBOARD DEVICE, CONTROL METHOD, AND PROGRAM PRODUCT WHICH DISPLAY CANDIDATES FOR CONNECTION

(71) Applicant: Shigeo Araki, Kanagawa (JP)

(72) Inventor: Shigeo Araki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/699,237

(22) Filed: Nov. 29, 2019

(65) Prior Publication Data

US 2020/0177406 A1 Jun. 4, 2020

(30) Foreign Application Priority Data

Nov. 30, 2018 (JP) .............................. JP2018-225445
Oct. 7, 2019 (JP) .............................. JP2019-184258

(51) Int. Cl.
  *H04L 12/18* (2006.01)
  *G06F 16/176* (2019.01)
(52) U.S. Cl.
  CPC ........ *H04L 12/1831* (2013.01); *G06F 16/176* (2019.01); *H04L 12/1822* (2013.01)
(58) Field of Classification Search
  CPC ............. H04L 12/1831; H04L 12/1822; G06F 16/176

(Continued)

(56) References Cited

U.S. PATENT DOCUMENTS

2009/0268009 A1 * 10/2009 Oya .................... H04L 12/1822
  348/14.09
2009/0319916 A1 * 12/2009 Gudipaty .............. H04L 65/403
  715/753

(Continued)

FOREIGN PATENT DOCUMENTS

JP    2006-005590    1/2006
JP    2017-091559    5/2017

OTHER PUBLICATIONS

U.S. Appl. No. 16/270,688, filed Feb. 8, 2019.

(Continued)

*Primary Examiner* — Nicholas R Taylor
*Assistant Examiner* — Chong G Kim
(74) *Attorney, Agent, or Firm* — Xsensus LLP

(57) ABSTRACT

Disclosed is an information processing device capable of remote sharing with one or a plurality of other information processing devices. The information processing device acts as a reference information processing device, and includes a memory; and one or more processors coupled to the memory and configured to display one or more of the other information processing devices as a candidate for remote connection, the one or more of the other information processing devices being used by same participants as participants determined in the reference information processing device; prompt a user of the reference information processing device to select any of the one or more of the other information processing devices displayed as a candidate for remote connection; and remotely connect the reference information processing device to the selected one or more of the other information processing devices.

12 Claims, 24 Drawing Sheets

(58) Field of Classification Search
USPC .......................................................... 709/204
See application file for complete search history.

(56) References Cited

U.S. PATENT DOCUMENTS

| | | |
|---|---|---|
| 2015/0029937 A1 | 1/2015 | Tamura |
| 2018/0012191 A1* | 1/2018 | Rosenberg ............ H04L 65/403 |
| 2019/0020770 A1 | 1/2019 | Araki |
| 2019/0129669 A1 | 5/2019 | Takahashi et al. |
| 2019/0235735 A1 | 8/2019 | Toyota et al. |

OTHER PUBLICATIONS

Extended European Search Report dated Mar. 31, 2020, issued in corresponding European Patent Application No. 19212210.9, 10 pages.

* cited by examiner

FIG.5

SERVICE ACCOUNT INFORMATION

| USER ID | NAME | EMAIL ADDRESS |
|---------|------|---------------|
| a01 | Mary | a01@example.com |
| a02 | Sato | a02@example.com |
| a04 | Saito | a04@example.com |
| ... | ... | ... |

FIG.6

CONFERENCE SCHEDULE INFORMATION

| SCHEDULE NAME | OWNER USER | ORGANIZED TIME AND DURATION | SCHEDULED PARTICIPANT LIST | ATTACHED FILE |
|---------------|------------|------------------------------|----------------------------|---------------|
| Meeting01 | a01,b02 | 2010-04-05 10:00-12:00 | a01,a02,a04 | a01.doc |
| ... | ... | ... | ... | ... |

FIG.7

STORAGE INFORMATION

| OWNER USER | TYPE | NAME |
|---|---|---|
| a02 | FILE | a02.doc |
| a02 | FOLDER | /WeeklyMeeting |

FIG.8

SHARED SITE INFORMATION

| SITE NAME | USER | TYPE | NAME |
|---|---|---|---|
| A-Group-Site | a01,a02 | FILE | a-shared01.doc |
| | | FOLDER | /DailyMeeting |
| B-Group-Site | b01,b02 | FOLDER | /WeeklyMeeting |

FIG.9

USER INFORMATION LIST

| USER ID | NAME | SETTING INFORMATION | SERVICE INFORMATION | IDENTIFICATION INFORMATION |
|---|---|---|---|---|
| user001 | Mary Smith | setting1 | service11,service12 | ICCARD-123 |
| user002 | Sato Suzuki | setting2 | service21,service22 | ICCARD-248 |
| user003 | Alice Liddell | setting3 | service3 | ICCARD-390 |
| user004 | Saito Yu | setting4 | service41,service42 | ICCARD-450 |
| ... | ... | ... | ... | ... |

FIG.10

SERVICE INFORMATION LIST

| SERVICE INFORMATION | USER ID | ADDRESS INFORMATION | EXTERNAL SERVICE USER ID | AUTHENTICATION TOKEN FOR EXTERNAL SERVICE |
|---|---|---|---|---|
| service11 | user001 | office@example.com | a01 | eyJhbGc11... |
| service12 | user001 | suite@example.com | b01 | eyJhbGc12... |
| service21 | user002 | office@example.com | a02 | eyJhbGc21... |
| service22 | user002 | suite@example.com | b02 | eyJhbGc22... |
| service3 | user003 | alice@example.com | | |
| service41 | user004 | office@example.com | a04 | eyJhbGc41... |
| service42 | user004 | suite@example.com | b04 | eyJhbGc42... |
| ... | ... | ... | ... | ... |

FIG.11

| DEVICE IP ADDRESS | SCHEDULE NAME | FILE NAME | SAVING DESTINATION FOLDER | SHARED SITE INFORMATION | PARTICIPANT INFORMATION |
|---|---|---|---|---|---|
| 192.168.0.2 | Meeting01 | | /DailyMeeting | A-Group-Site | user001, user002, user004 |
| 192.168.0.3 | | | | | user005 |
| 192.168.0.4 | Meeting01 | | | B-Group-Site | user001, user002, user004 |
| 192.168.0.5 | | | | | user004 |
| ××× | ××× | ××× | ××× | ××× | ××× |

FIG.15

| SERVICE INFORMATION | USER ID | ADDRESS INFORMATION | EXTERNAL SERVICE USER ID | AUTHENTICATION TOKEN FOR EXTERNAL SERVICE |
|---|---|---|---|---|
| service11 | user001 | office@example.com | a01 | eyJhbGci11··· |
| service12 | user001 | suite@example.com | b01 | eyJhbGci12··· |

FIG.16

SCHEDULE SELECTING SCREEN 1000

| SELECTION | SCHEDULE NAME | ORGANIZED TIME AND DURATION | SCHEDULED PARTICIPANT LIST |
|---|---|---|---|
| ☑ | Meeting01 | 2010-04-05 10:00–12:00 | a01,a02,a04 |
| ☐ | Meeting02 | 2010-04-05 15:00–16:00 | a01,b01 |

CONNECTION DESTINATION SELECTION SCREEN 1500

| SELEC-TION | DEVICE IP ADDRESS | SCHEDULE NAME | FILE NAME | SAVING DESTINATION FOLDER | SHARED SITE INFORMATION | PARTICIPANT INFORMATION |
|---|---|---|---|---|---|---|
| REFER-ENCE | 192.168.0.2 | Meeting01 | | /DailyMeeting | A-Group-Site | user001,user002 user004 |
| ☑ | 192.168.0.4 | Meeting01 | | | | user001,user002 user004 |
| ☑ | 192.168.0.5 | | | | | user004 |
| ☐ | 192.168.0.3 | | | | B-Group-Site | user005 |

OK

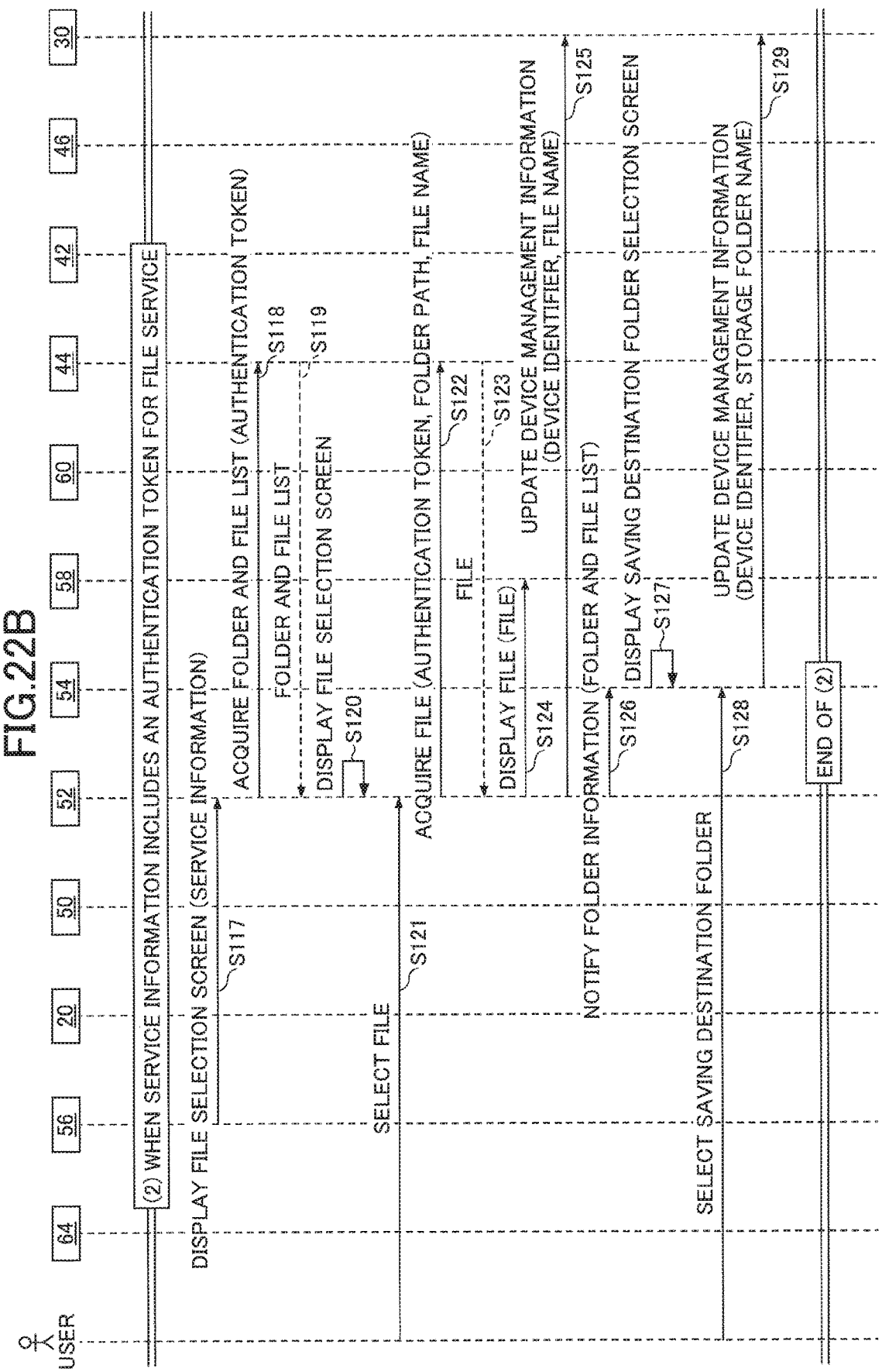

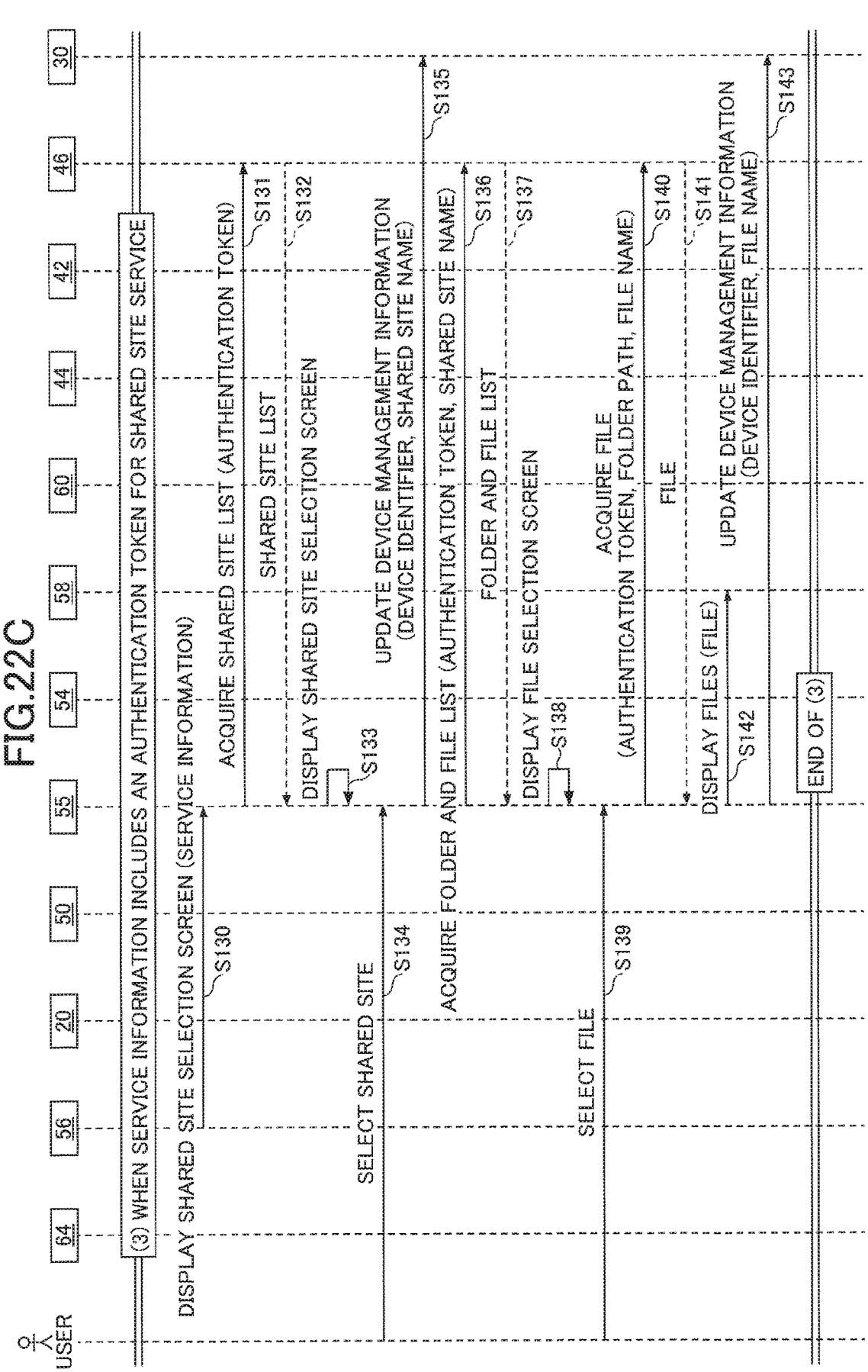

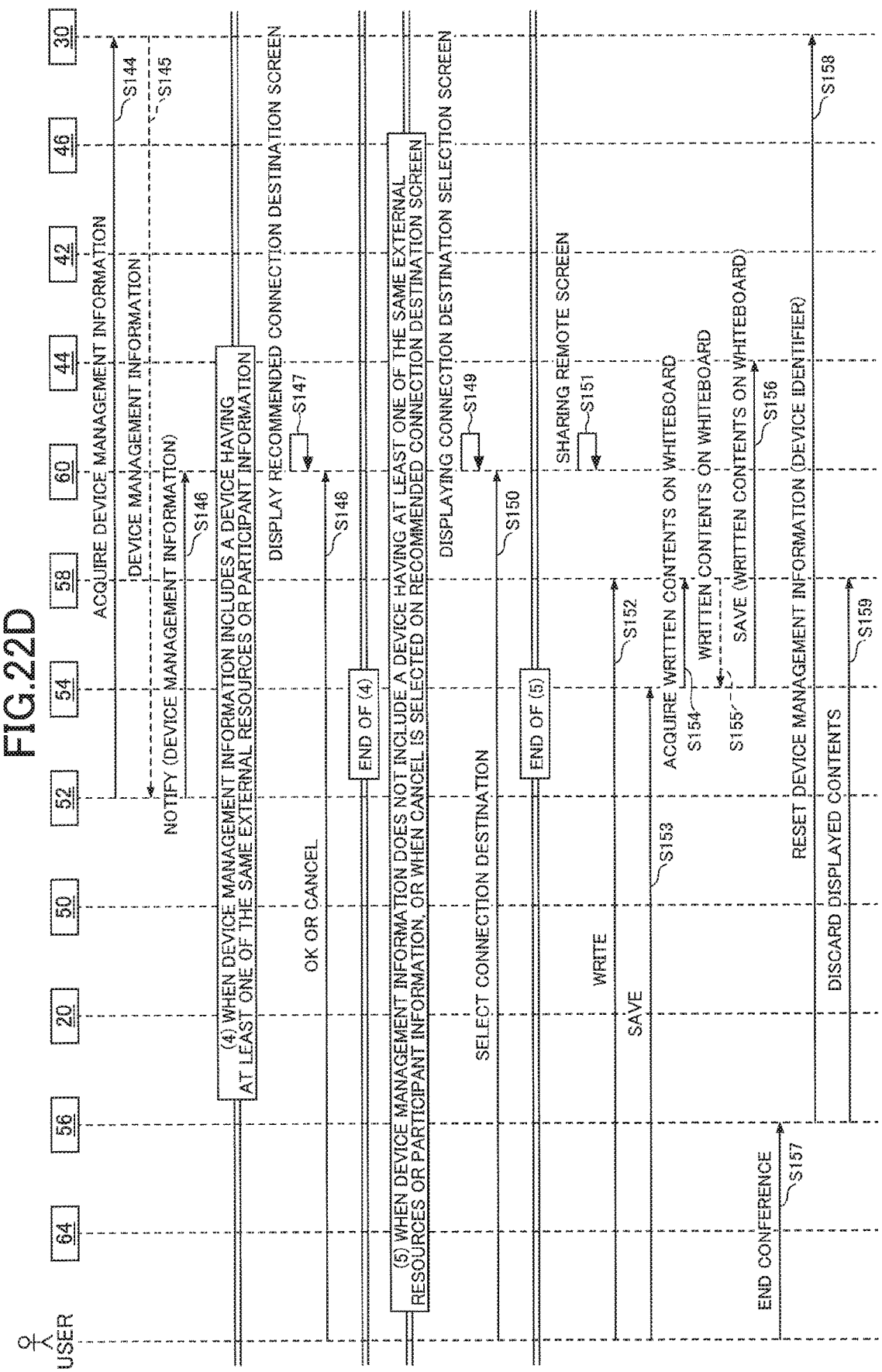

INFORMATION PROCESSING DEVICE, INFORMATION PROCESSING SYSTEM, ELECTRONIC WHITEBOARD DEVICE, CONTROL METHOD, AND PROGRAM PRODUCT WHICH DISPLAY CANDIDATES FOR CONNECTION

CROSS-REFERENCE TO RELATED APPLICATIONS

The present application claims priority under 35 U.S.C. § 119 to Japanese Patent Application No. 2018-225445, filed on Nov. 30, 2018, and Japanese Patent Application No. 2019-184258, filed on Oct. 7, 2019, the contents of which are incorporated herein by reference in their entirety.

BACKGROUND OF THE INVENTION

1. Field of the Invention

The disclosures herein generally relate to an information processing device, an information processing system, an electronic whiteboard device, a control method, and a program product.

2. Description of the Related Art

Related art electronic whiteboard devices are typically configured to remotely share written contents, camera images, and microphone sound or speech with another electronic whiteboard device, PC, or the like.

Teleconferencing systems are, for example, known to use the electronic whiteboard devices for connecting multiple locations to enable remote collaboration. One example of such teleconferencing systems may be a video conferencing system. A typical video conferencing system is configured to include input and output devices for images and speech, such as cameras, microphones, monitors, speakers, and the like; coding and decoding devices for images and speech; and communication devices and lines for connecting locations. Japanese unexamined patent application publication No. 2006-5590 (Patent Document 1), for example, discloses a remote video conferencing system for sharing data between remote conference rooms. In this remote video conferencing system, respective electronic whiteboard devices are provided to the remote conference rooms so as to write to each other, and share applications to operate the shared applications.

However, in such a related art remote video conferencing system, when a user of one electronic whiteboard device selects an information processing device, such as another electronic whiteboard device or a PC, as a remote connection destination, from multiple information processing devices, the user needs to use IP addresses or IDs of information processing devices for selecting a desired information processing device as the remote connection destination. However, such IP addresses or IDs of the information processing devices are, unfortunately, not directly associative with the information processing devices for being selected as a remote connection destination. This results in an increase in the user's workload of selecting the remote connection destination.

RELATED-ART DOCUMENT

Patent Document

Patent Document 1: Japanese Unexamined Patent Application Publication No. 2006-5590

SUMMARY OF THE INVENTION

According to an embodiment, an information processing device capable of remote sharing with one or a plurality of other information processing devices is provided. The information processing device acts as a reference information processing device, and includes the information processing device comprising:

a memory; and one or more processors coupled to the memory and configured to display one or more of the other information processing devices as a candidate for remote connection, the one or more of the other information processing devices being used by same participants as participants determined in the reference information processing device;

prompt a user of the reference information processing device to select any of the one or more of the other information processing devices displayed as a candidate for remote connection; and remotely connect the reference information processing device to the selected one or more of the other information processing devices.

BRIEF DESCRIPTION OF THE DRAWINGS

FIG. 5 is a table illustrating an example of service account information;

FIG. 6 is a table illustrating an example of the conference schedule information;

FIG. 7 is a table illustrating an example of storage information;

FIG. 8 is a table illustrating an example of the shared site information;

FIG. 9 is a table illustrating an example of a user information list;

FIG. 10 is a table illustrating an example of a service information list;

FIG. 11 is a table illustrating an example of device management information;

FIG. 15 is a table illustrating an example of service information specified from the acquired identification information;

FIG. 16 is a conceptual diagram illustrating an example of a schedule selecting screen;

FIG. 21 is a conceptual diagram illustrating an example of a connection destination selecting screen;

FIG. 22B is a sequence diagram illustrating an example of processing of an information processing system according to an embodiment;

FIG. 22C is a sequence diagram illustrating an example of processing of an information processing system according to an embodiment; and FIG. 22D is a sequence diagram illustrating an example of processing of an information processing system according to an embodiment.

DESCRIPTION OF THE EMBODIMENT

Hereinafter, one embodiment of the present invention will be described with reference to the accompanying drawings. According to the present embodiment, an electronic whiteboard device that performs remote sharing is illustrated as an example of an "information processing device". However, the present invention is not limited to the electronic whiteboard device, and may be any information processing device such as a PC.

(System Configuration)

Figure 1:
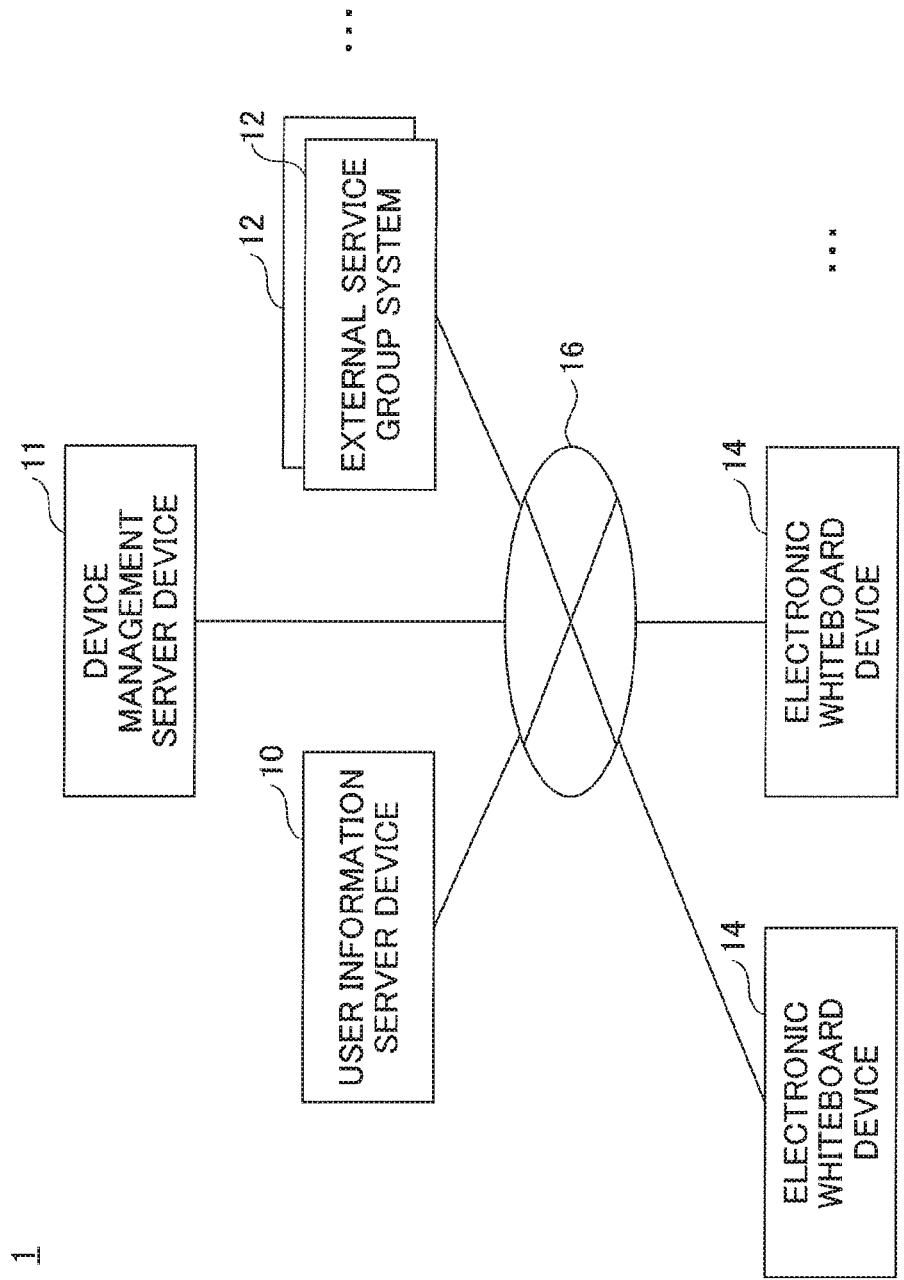
FIG. 1 is a schematic diagram illustrating an example of an information processing system according to an embodiment.

FIG. 1 is a configuration diagram illustrating an example of an information processing system, according to an embodiment. As illustrated in FIG. 1, an information processing system 1 includes a user information server device 10, a device management server device 11, multiple external service group systems 12, and multiple electronic whiteboard devices 14, which are connected to each other through a network 16, such as the Internet or a LAN. The user information server device 10, the device management server device 11, and the electronic whiteboard devices 14 form an electronic whiteboard system. The user information server device 10, the device management server device 11, and the electronic whiteboard devices 14 operate by linking with the external service group systems 12 to provide functions relating to the electronic whiteboard devices 14. The external service group systems 12 are configured external to the electronic whiteboard system.

External service groups provided by the external service group systems 12 are so-called groupware, and different external services belonging to the same external service group may be used with the same authentication information (a combination of ID and password, an access token, etc.).

For example, an external service group refers to an integrated service, such as Office 365 (registered trademark), which includes a user service, a storage service, a schedule service, a shared site service, and the like.

One external service group is provided such that multiple different services, such as a user service, a storage service, a schedule service, and a shared site service, are used with the identical user account.

Multiple external service groups are provided, for example, by different companies. Hence, a case where one user uses a company A's external service group and a company B's external service group may be expected. Note that the multiple external service groups being provided by difference companies may merely be one example; multiple external service groups may not necessarily be provided by different companies but may be provided by the same company. The external service group systems 12 are implemented by one or more computers.

The user information server device 10 stores a later-described user information list, which is used by the electronic whiteboard devices 14. The user information server device 10 may be shared by multiple electronic whiteboard devices 14, and may not necessarily be located on the same network segment. The user information server device 10 may be included in the electronic whiteboard devices 14. The user information server device 10 is implemented by one or more computers. The device management server device 11 stores later-described device management information, which is used by the electronic whiteboard devices 14. The device management server device 11 is implemented by one or more computers. Note that in the configuration diagram illustrated in FIG. 1, the user information server device 10 and the device management server device 11 are separately provided; however, the user information server device 10 and the device management server device 11 may be provided by one server device.

The electronic whiteboard devices 14 each displays, for example, an image drawn by an electronic pen or by hand. The electronic whiteboard devices 14 may also each display an image of an electronic file read from a USB memory, a PC connected via a cable, or the like. The electronic whiteboard devices 14 each have a function to remotely share image data of the displayed image with other electronic whiteboard devices 14 acting as remote connection destinations. Remote sharing is to share written contents, camera images, microphone sound or speech, and the like with other electronic whiteboard devices 14. Further, the electronic whiteboard devices 14 each have an authentication function for authenticating a user, such as IC card authentication and face authentication. Remote sharing includes sharing of a screen displayed on respective electronic whiteboards located at remote locations, joint editing of the screen (execution of electronic whiteboard functions at remote locations), sharing of images and videos of users such as participants of the conference captured by cameras owned by electronic whiteboards. Remote sharing also includes sharing, joint editing, and transmission of files in individuals' storages and a shared storage that are acquired from electronic whiteboards.

The electronic whiteboard device 14 is merely an example of an information processing device, and any information processing device, which includes a remote sharing function, such as a remote conference system, a display, a projector, or the like, may be used. The remote sharing function of the information processing device may be provided by any method. For example, devices may mutually transmit and receive data directly with each other, or devices may mutually transmit and receive data with each other via a mediation server. As described above, the configuration of the information processing system 1 illustrated in FIG. 1 is merely an example. For example, at least some of the functions of the user information server device 10, the device management server device 11, and the external service group system 12 may be provided in the electronic whiteboard device 14.

Further, the information processing system 1 may have a configuration in which at least some of the functions of the user information server device 10, the device management server device 11, the external service group system 12, and the electronic whiteboard device 14 may be implemented by other information processing devices other than the user information server device 10, the device management server device 11, the external service group system 12, and the electronic whiteboard device 14.

(Computer Hardware Configuration)

Figure 2:
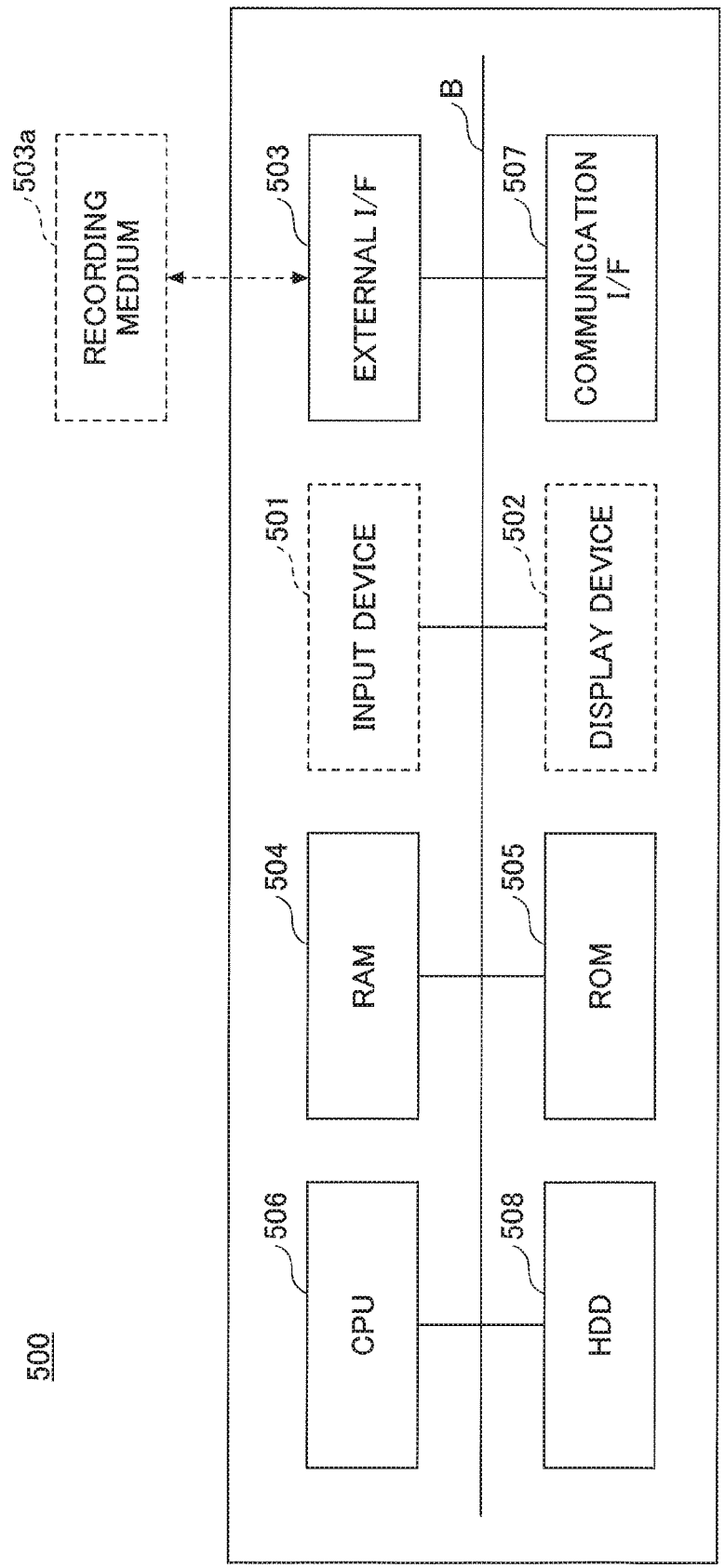
FIG. 2 is a hardware configuration diagram illustrating an example of a computer.

The user information server device 10, the device management server device 11, and the external service group system 12 in FIG. 1 may, for example, be implemented by a computer having a hardware configuration illustrated in FIG. 2. FIG. 2 is a hardware configuration diagram illustrating an example of a computer.

A computer 500 illustrated in FIG. 2 includes an input device 501, a display device 502, an external I/F 503, a RAM 504, a ROM 505, a CPU 506, a communication I/F 507, and an HDD 508, which are connected to each other by a bus B. The input device 501 and the display device 502 may be connected and utilized optionally.

The input device 501 includes a keyboard, a mouse, a touch panel, or the like, and may be used by a user to input respective operation signals. The display device 502 includes a display or the like to display results of processing performed by computer 500.

The communication I/F 507 is an interface that connects the computer 500 to various networks. Thus, the computer 500 is enabled to perform data communication via the communication I/F 507.

The HDD 508 is an example of a non-volatile storage device that stores programs and data.

The stored programs and data include an operating system and application; the operating system is the basic software for controlling the entire computer 500, and the applications provide various functions on the operating system.

Note that the computer 500 may use, instead of the HDD 508, a drive device (e.g., a solid state drive (SSD)) that uses flash memory as a storage medium.

An external I/F 503 is an interface with an external device. An external device includes a recording medium 503a or the like. The computer 500 may read data from and/or write data into the recording medium 503a via the external I/F 503. Examples of the recording medium 503a include a flexible disk, CD, DVD, SD memory card, USB memory, SIM card, and the like.

The ROM 505 is an example of a non-volatile semiconductor memory (storage device) that may retain programs and data upon the power being turned off. The ROM 505 stores programs and data such as BIOS, OS settings, and network settings that are executed upon activation of the computer 500. The RAM 504 is an example of a volatile semiconductor memory (storage device) that temporarily retains programs and data.

The CPU 506 works as an arithmetic logic unit and a control unit. The CPU 506 implements controls and functions of the entire computer 500 by reading programs and data, from storage devices such as the ROM 505 and the HDD 508, and loading the programs and data onto the RAM 504 to execute processing. The CPU 506 may be implemented by one or more processors.

For example, the user information server device 10, the device management server device 11, and the external service group system 12 may implement later-described various processing according to the hardware configuration of the computer 500 illustrated in FIG. 2.

(Hardware Configuration of Electronic Whiteboard Device)

Figure 3:
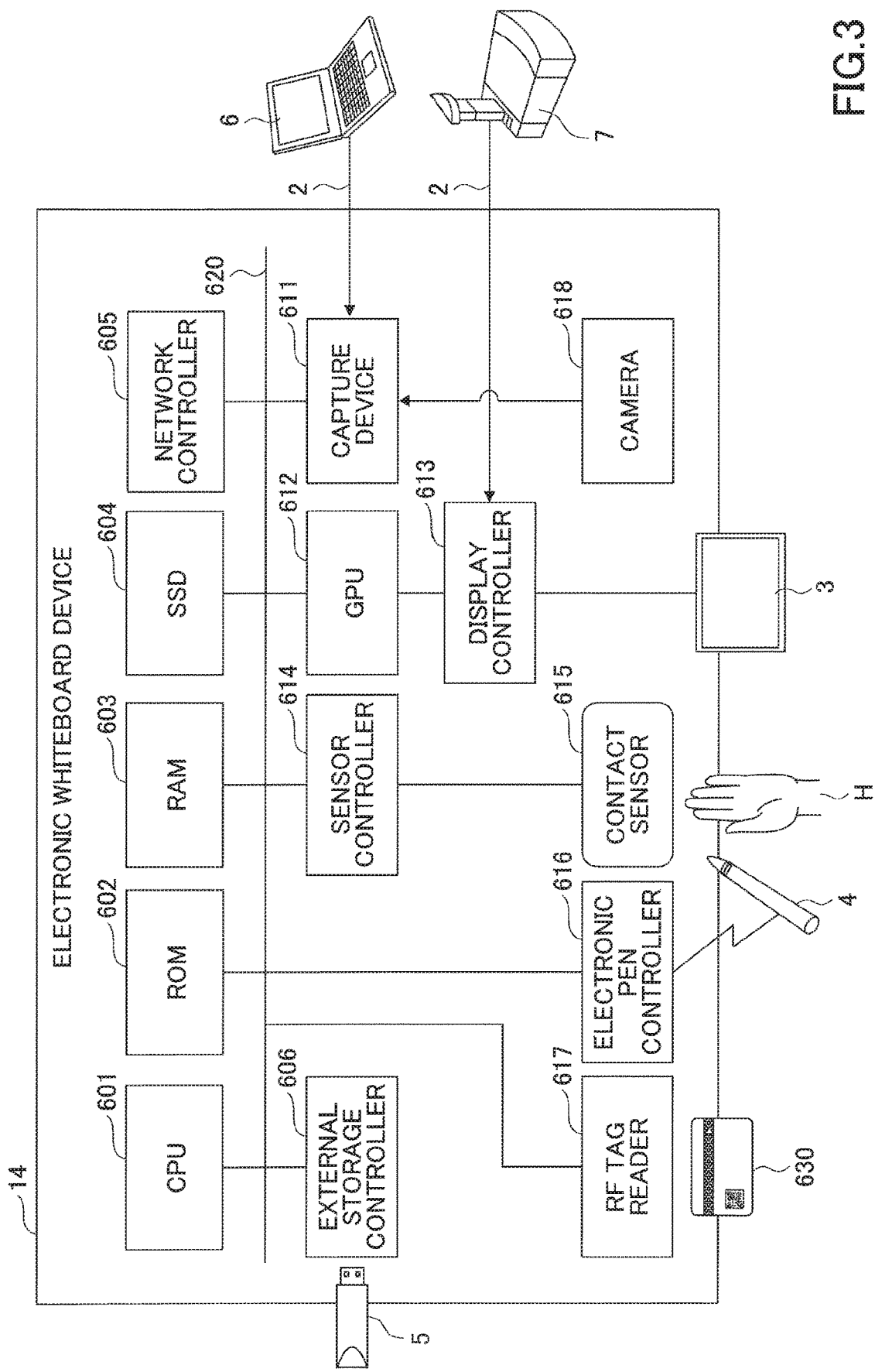
FIG. 3 is a hardware configuration diagram illustrating an example of an electronic whiteboard device.

FIG. 3 is a hardware configuration diagram illustrating an example of an electronic whiteboard device. An electronic whiteboard device 14 includes a CPU 601, a ROM 602, a RAM 603, an SSD 604, a network controller 605, and an external storage controller 606.

The CPU 601 controls overall operations of the electronic whiteboard device 14. The ROM 602 stores programs used to drive the CPU 601. The RAM 603 is used as a work area of the CPU 601. The SSD 604 stores various data, such as programs for an electronic whiteboard device 14. The network controller 605 controls communication with the network 16. The external storage controller 606 controls communication with a recording medium such as USB memory 5.

The electronic whiteboard device 14 also includes a capture device 611, a GPU (Graphics Processing Unit) 612, a display controller 613, a sensor controller 614, a contact sensor 615, an electronic pen controller 616, an RF tag reader 617, and a camera 618.

The capture device 611 captures video information as a still image or video file from a PC 6 or camera 618. The GPU 612 is specialized in graphics operations. The display controller 613 controls and manages display of a screen to output an output image that is output from the GPU 612 to a display 3 or to a video conference terminal 7. The sensor controller 614 controls processing of the contact sensor 615. The contact sensor 615 detects contact on the display 3 made by an electronic pen 4 or a hand H of a user, or the like.

The contact sensor 615 inputs coordinates and detects coordinates by an infrared ray blocking method. The infrared ray blocking method is conducted as follows. Two light emitting/receiving devices, which are installed at opposite upper ends of the display 3, emit multiple infrared rays parallel to the display 3, the emitted multiple infrared rays are then reflected by reflecting members disposed around the display 3, and the receiving devices receive light rays returning along the same optical paths as those of the emitted multiple infrared rays. The contact sensor 615 outputs to the sensor controller 614 an ID of the infrared rays emitted by the two light emitting/receiving devices and blocked by an object. The sensor controller 614 identifies a coordinate position that is a contact position of the object.

Further, the contact sensor 615 does not necessarily use the infrared ray blocking method. The contact sensor 615 may be any type of a detector, such as an electrostatic capacitance touch panel that identifies a contact position by sensing a change in capacitance, a resistive film touch panel that identifies a contact position by a voltage change of two opposing resistive films, or an electromagnetic induction touch panel that identifies a contact position by detecting an electromagnetic induction caused upon an object being in contact with a display unit.

The electronic pen controller 616 that performs communication with the electronic pen 4 determines whether the tip or the bottom of electronic pen 4 has touched the display 3. Note that the electronic pen controller 616 may determine whether a part of the electronic pen 4 gripped by the user or other parts of the electronic pen 4 have touched the display 3.

The RF tag reader 617 wirelessly reads identification information unique to an IC card 630 from an RF tag embedded in the IC card 630. The RF tag reader 617 may be included in the electronic whiteboard device 14 or externally attached to the electronic whiteboard device 14. The IC card 630 may be included in a smart device such as a smartphone. Further, the electronic whiteboard device 14 may use any devices capable of obtaining identification information that identifies users other than the RF tag reader 617; for example, biometric authentication devices (e.g., a fingerprint scanner, a palm-print scanner, and an iris scanner) or bar code readers may be used.

The electronic whiteboard device 14 illustrated in FIG. 3 includes a bus line 620, such as an address bus or data bus, for electrically connecting to a CPU 601, a ROM 602, a RAM 603, an SSD 604, a network controller 605, an external storage controller 606, a capture device 611, a GPU 612, a sensor controller 614, an electronic pen controller 616, and RF tag reader 617. Note that programs for the electronic whiteboard device 14 may be stored and distributed in a computer-readable recording medium, such as a CD-ROM.

(Functional Configuration of Information Processing System 1)

Figure 4:
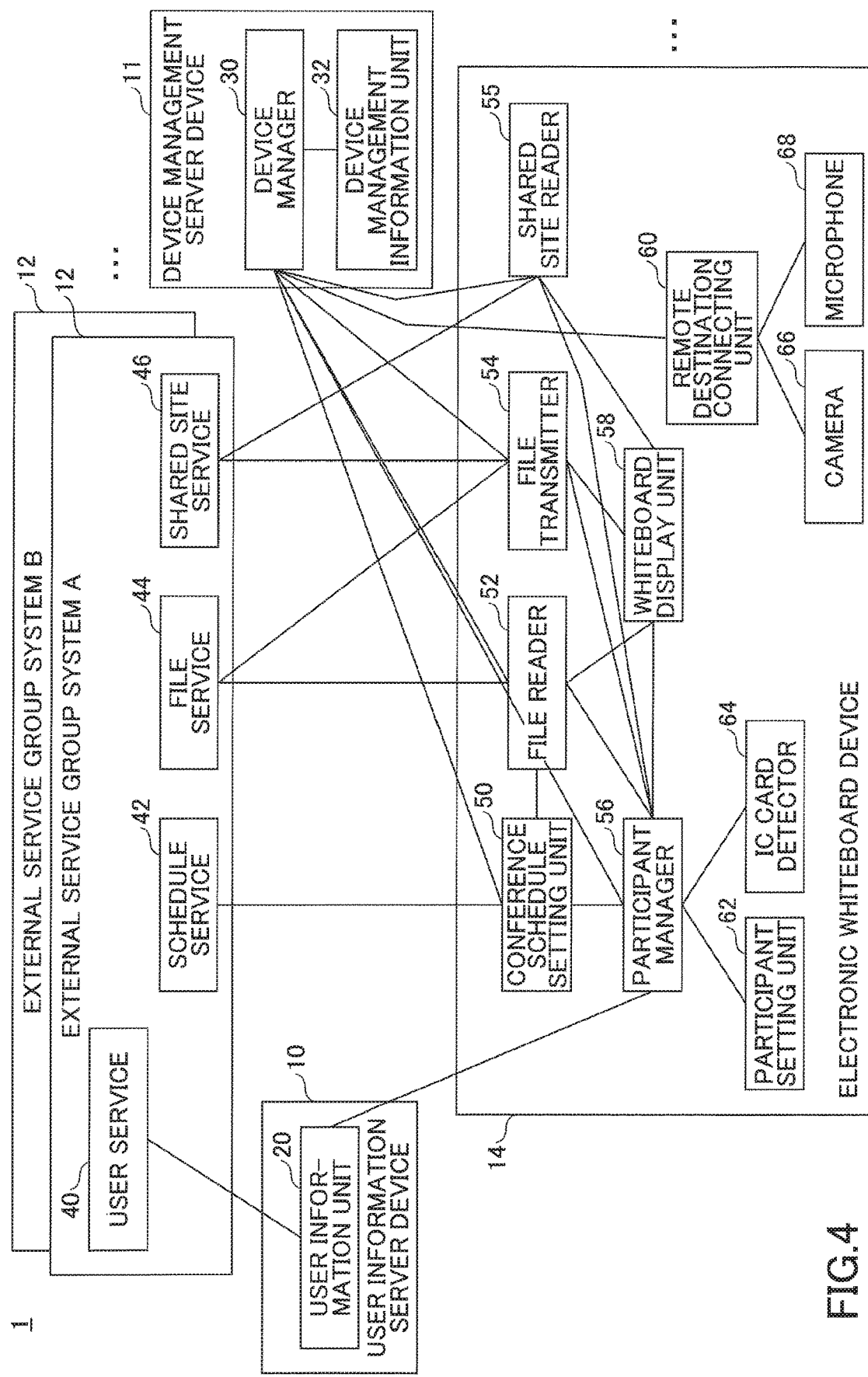
FIG. 4 is a functional configuration diagram illustrating an example of an information processing system according to an embodiment.

An information processing system 1 according to an embodiment is implemented, for example, by functional configurations illustrated in FIG. 4. FIG. 4 is a functional configuration diagram illustrating an example of an information processing system, according to an embodiment. The functional configurations illustrated in FIG. 4 appropriately omit configurations unnecessary for the description of the present embodiment.

The information processing system 1 illustrated in FIG. 4 is configured to include a user information server device 10, a device management server device 11, multiple external service group systems 12, and multiple electronic whiteboard devices 14. The external service group systems 12 in FIG. 4 each indicate an example of an integrated service, which includes a user service 40, a schedule service 42, a file service 44, and a shared site service 46, and the like.

The user service 40 of the external service group system 12 stores, for example, service account information illustrated in FIG. 5. FIG. 5 is a table illustrating an example of the service account information. The service account information illustrated in FIG. 5 includes a user ID, a name, and an email address of a user who uses an external service group system 12 (a user of external service).

The schedule service 42 stores, for example, the conference schedule information illustrated in FIG. 6. FIG. 6 is a table illustrating an example of conference schedule information. The conference schedule information in FIG. 6 includes, for example, a conference schedule name, an owner user, organized time and duration, a scheduled participant list, and an attached file.

The file service 44 may store and read a user's file. The file service 44 stores, for example, storage information illustrated in FIG. 7. FIG. 7 is a table illustrating an example of the storage information. The storage information illustrated in FIG. 7 may, for example, include an owner user of a file or folder, a type of a file or folder, and a name of a file or folder. The storage information thus manages types of files and folders, and names of files and folders owned by users, on a per user basis.

The shared site service 46 may include a webpage having a chat function or a whiteboard function, in addition to storing and reading functions to store and read user folders and files on the shared site. The shared site service 46 may, for example, store shared site information illustrated in FIG. 8. FIG. 8 is a table illustrating an example of the shared site information. The shared site information illustrated in FIG. 8 includes a site name, a user, a type of file or folder, and a name. As described above, the shared site information illustrated in FIG. 8 manages users, who use webpages having a chat function or a whiteboard function in addition to functions to store and read files, on a per shared site basis.

The user information server device 10 includes a user information unit 20. The user information unit 20 stores a list of user information (user information list) as illustrated in FIG. 9 and a list of service information (service information list), as illustrated in FIG. 10. FIG. 9 is a table illustrating an example of a user information list. FIG. 10 is a table illustrating an example of a service information list.

The user information list illustrated in FIG. 9 includes a user ID, a name, setting information, service information, and identification information of a user (a user of an electronic whiteboard system) that are managed in an electronic whiteboard system. The service information list illustrated in FIG. 10 is information used for associating a user ID of the electronic whiteboard system with a user ID of an external service (also referred to as "external service user ID"). The service information list includes service information, a user ID of the electronic whiteboard system, address information, an external service user ID, and an authentication token for external service.

The service information of the user information list in FIG. 9 is used for specifying the service information from the service information list in FIG. 10. The identification information of the user information list in FIG. 9 is used for identifying a user based on an input from a later-described IC card detector 64. For example, the identification information "ICCARD-123" in FIG. 9 is an example of identification information unique to an IC card 630, which is input from the IC card detector 64. The service information of a user, whose identification information has been identified by referring to the user information list in FIG. 9, may be identified from the service information list illustrated in FIG. 10.

The service information list illustrated in FIG. 10 is a list of service information for users to utilize external service group systems 12. The service information of the service information list in FIG. 10 includes different accounts (each including: user ID, name, and email address) for respective external service groups, with respect to one user. That is, one user has one or more accounts for external service groups. For example, one user (e.g., user ID: 001 in FIG. 10), who uses two external service groups (two external service user IDs: a01, b01), has two service information (service 11, service 12). In other words, by referring to the service information of the service information list in FIG. 10, all the account information of users who use the information processing system 1 may each be uniquely identified, regardless of any accounts used for external service groups (i.e., external service user IDs). The address information and the external service user ID are examples of access information to the external service group systems 12. The authentication token for external service is an example of authentication information of an external service group system 12.

The electronic whiteboard device 14 illustrated in FIG. 4 includes a conference schedule setting unit 50, a file reader 52, a file transmitter 54, a shared site reader 55, a participant manager 56, a whiteboard display unit 58, a remote destination connecting unit 60, a participant setting unit 62, an IC card detector 64, a camera 66, and a microphone 68.

The IC card detector 64 reads identification information from a user's IC card 630. The participant manager 56 transmits identification information read by the IC card detector 64 to the user information server device 10, and acquires service information of the user corresponding to the read identification information from the user information unit 20 of the user information server device 10. The participant manager 56 transmits the service information of the user acquired from the user information unit 20 to the conference schedule setting unit 50, the file reader 52, the file transmitter 54, and the shared site reader 55.

The conference schedule setting unit 50 uses the service information of the user received from the participant manager 56 to acquire from the schedule service 42 the conference schedule information indicating that the user is included in the scheduled participant list (see FIG. 6). Further, the conference schedule setting unit 50 has a user interface (UI) for prompting a user to select a schedule from the acquired conference schedule information.

Upon a schedule being selected by a user, the conference schedule setting unit 50 reads information from an attached file of the conference schedule information corresponding to the schedule selected by the user, and transmits the read information to the file reader 52, thereby acquiring the attached file from the external service group system 12. Note that the schedule selected by the user does not necessarily have an attached file. In a case of a schedule being selected by a user, information about participants included in the scheduled participant list may be acquired in addition to reading of information of the attached file. Upon a schedule being selected by the user, the conference schedule setting unit 50 transmits an identifier of the electronic whiteboard device 14 and information about the schedule selected by the user to the device management server device 11.

The identifier of the electronic whiteboard device 14 may be any information that identifies the electronic whiteboard device 14, and various types of information, such as an IP address and a MAC address, may be used as the identifier of the electronic whiteboard device 14. The information about the schedule may be a schedule name or an ID indicating the schedule.

The file reader 52 has a function to read a file from the file service 44 of the external service group system 12 to the electronic whiteboard device 14. The file reader 52 includes a UI for prompting a user to select a file to be read from the file service 44 of the external service group system 12 to the electronic whiteboard device 14. The file reader 52 reads a file from the file service 44 to the electronic whiteboard device 14 by using the service information of the user received from the participant manager 56.

Upon a file being selected by the user as a file to be read from the file service 44, the file reader 52 transmits the identifier of the electronic whiteboard device 14 and information about the file selected by the user to the device management server device 11. The information about the file may be a file name or a file path, or may be an ID indicating the file.

The shared site reader 55 has a function to read a file from the shared site service 46 of the external service group system 12 to the electronic whiteboard device 14, and provides a webpage having a chat function and a whiteboard function. The shared site reader 55 includes a UI for prompting a user to select a file to be read from the shared site service 46 of the external service group system 12 to the electronic whiteboard device 14. The shared site reader 55 reads a file from the shared site service 46 to the electronic whiteboard device 14 using the service information of the user received from the participant manager 56.

In a case where the shared site service 46 has a display function of a webpage having a chat function or a whiteboard function, the shared site reader 55 reads the webpage from the shared site service 46 using a web browser of the electronic whiteboard device 14. Similar to the file reader 52, the shared site reader 55 transmits a file, a folder, and a site URL of a webpage read from the shared site service 46 to the device management server device 11.

The file transmitter 54 acquires written contents of the electronic whiteboard device 14 from the whiteboard display unit 58, and transmits files of written contents to the file service 44 or the shared site service 46 by using user's service information received from the participant manager 56.

The file transmitter 54 has a UI including a screen for prompting a user to select a folder (saving destination folder) to store files and a screen for prompting a user to save files in the selected saving destination folder. At the start of a conference, for example, a user selects a saving destination folder for saving a file, and saves the file at the time the conference ends. Upon the saving destination folder being selected by the user, the file transmitter 54 transmits an identifier of the electronic whiteboard device 14 and information about the saving destination folder selected by the user to the device management server device 11.

The whiteboard display unit 58 displays a file read by the file reader 52 or the shared site reader 55 from the file service 44 or the shared site service 46. The whiteboard display unit 58 receives a user's writing on the electronic whiteboard device 14, and displays the user's written contents on the electronic whiteboard device 14. The whiteboard display unit 58 provides the file transmitter 54 with written contents on the electronic whiteboard device 14. The written contents include contents of the file read by the file reader 52 or the shared site reader 55 from the file service 44 or the shared site service 46, and the user's written contents on the electronic whiteboard device 14.

The device management server device 11 illustrated in FIG. 4 is configured to have a device manager 30 and a device management information unit 32. The device manager 30 writes, into device management information illustrated in FIG. 11, information received from the conference schedule setting unit 50, the file reader 52, the file transmitter 54, or the shared site reader 55. The device management information unit 32 stores the device management information as illustrated in FIG. 11. FIG. 11 is a table illustrating an example of device management information.

The device management information illustrated in FIG. 11 stores an IP address (device IP address) in association with a schedule name, a file name, a saving destination folder, a shared site information, and participant information, and the like. The IP address (device IP address) is an example of information that can identify an electronic whiteboard device 14. The schedule name, file name, saving destination folder, and shared site information are examples of "resources used for remote sharing" or "remote sharing resources". The participant information is an example of "participant information used for remote sharing" and "remote sharing participant information". Note that the participants included in the participant information indicate participants who have participated in remote sharing. The participant information of the device management information in FIG. 11 includes user IDs of the electronic whiteboard system, which are assigned to participants of a schedule. The user IDs of the electronic whiteboard system are obtained by converting the external service user IDs registered in the "scheduled participant list" of the conference schedule information illustrated in FIG. 6, based on the service information list illustrated in FIG. 10. The participant information of the device management information in FIG. 11 includes the user IDs of the electronic whiteboard system in association with scheduled participants (in the "scheduled participant list") in a predetermined schedule. The participant information of the device management information also includes user IDs of the electronic whiteboard system with respect to participants who are recognized upon the participants' logging into the electronic whiteboard device 14 using an IC card, or using an authentication method other than the IC card (e.g., face recognition, inputting of a login ID and a password, etc.). That is, the participant information of the device management information includes user IDs of the electronic whiteboard system with respect to participants who are currently logged into the electronic whiteboard device 14. Further, in the present embodiment, "remote sharing" is an example of remote sharing for a conference performed between multiple electronic whiteboard devices 14. Thus, "remote sharing participant information" may be referred to as "conference participant information", "remote conference participant information", or the like. Note that the schedule name of the device management information in FIG. 11 may be selected by a user or may be automatically selected based on the user's authentication and time. Resources, such as a schedule name of the device management information, may not necessarily be selected directly by a user, but may be specified by some operation of a user (e.g., authentication in the example of the schedule name). Examples of automatically selected resources, other than the schedule name, include the file name, site name, and the like, which are a user's predetermined initialization settings automatically loaded at the time of the user's authentication.

The remote destination connecting unit 60 is an example of a "remote destination connecting unit". The remote destination connecting unit 60 of the electronic whiteboard device 14 (acting as a reference electronic whiteboard device) remotely connects to other electronic whiteboard devices 14 by using respective IP addresses, and the reference electronic whiteboard device 14 remotely share written contents, camera images, and microphone sound or speech, etc., with the other electronic whiteboard devices 14. The remote destination connecting unit 60 has a UI for displaying a later-described recommended connection destination selecting screen or a connection destination selecting screen, and a UI for receiving a remote destination connecting request from a user.

Figure 12:
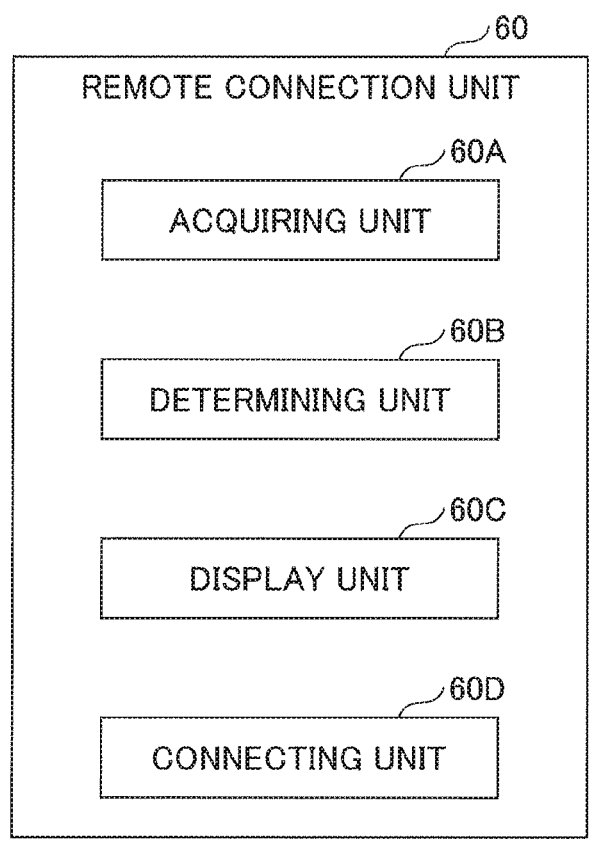
FIG. 12 is a block diagram illustrating a detailed functional configuration of a remote destination connecting unit.

FIG. 12 is a block diagram illustrating a detailed functional configuration of the remote destination connecting unit 60. As illustrated in FIG. 12, the remote destination connecting unit 60 includes an acquiring unit 60A, a determining unit 60B, a display unit 60C, and a connecting unit 60D.

The acquiring unit 60A is an example of "acquiring unit", which is configured to acquire the device management information from the device management server device 11. As illustrated in FIG. 11, the device management information indicates remote sharing resources (i.e., schedule name, file name, saving destination folder, and shared site information) and participant information in remote sharing, in association with the electronic whiteboard device acting as a reference electronic whiteboard device, and with other electronic whiteboard devices 14 that are other than the reference electronic whiteboard device.

The determining unit 60B is an example of "determining unit", which is configured to determine a candidate for a remote connection destination, from among multiple other electronic whiteboard devices 14. Specifically, the determining unit 60B determines, from among multiple other electronic whiteboard devices 14, one or more electronic whiteboard devices 14 that have device management information indicating the same participant information as participant information indicated in the device management information for the reference electronic whiteboard device, as a candidate for a remote connection destination. Note that the participant information indicated in the device management information for the reference electronic whiteboard device is "participants determined in the reference electronic whiteboard device".

Similarly, the determining unit 60B determines, from among multiple other electronic whiteboard devices 14, one or more electronic whiteboard devices 14 that have device management information indicating the same resources as resources indicated in the device management information for the reference electronic whiteboard device, as a candidate for a remote connection destination. Note that the resources indicated in the device management information for the reference electronic whiteboard device are any one of the schedule name, the file name, the saving destination folder, and the shared site information.

The display unit 60C is an example of a "display unit" and a "selection unit". The display unit 60C displays, to a user of the reference electronic whiteboard device, one or more of the other electronic whiteboard devices 14 determined as a candidate for remote connection destination on the recommended connection destination screen. The one or more of the other electronic whiteboard devices 14 are determined by the determining unit 60B as a candidate for remote connection destination. Accordingly, the user of the reference electronic whiteboard device is prompted to select any of the displayed other electronic whiteboard devices 14 as a remote connection destination.

The connecting unit 60D remotely connects to the one or more of the other electronic whiteboard devices 14, which are selected by the user of the reference electronic whiteboard device via the recommended connection destination screen.

Note that in the remote destination connecting unit 60, when the determining unit 60B determines one or more of the other electronic whiteboard devices 14 as a remote connection destination, the connecting unit 60D may automatically connect to the determined one or more of the other electronic whiteboard devices 14 without displaying the determined one or more of the other electronic whiteboard devices 14 to the user of the reference electronic whiteboard device.

Further, when the determining unit 60B does not determine any of the other electronic whiteboard devices 14 as a candidate for remote connection destination, the display unit 60C may display the connection destination selecting screen including all the connectable (accessible) electronic whiteboard devices 14 as remote connection destinations. In other words, when there are no electronic whiteboard devices 14 that have the device management information indicating the same participant information or the same resources as those indicated in the device management information for the reference electronic whiteboard device, the display unit 60C may display the connection destination selecting screen including all the connectable (accessible) electronic whiteboard devices 14 as remote connection destinations.

The function of the determining unit 60B may be performed outside the reference electronic whiteboard device 14, such as by the device management server device 11. In this case, the remote destination connecting unit 60 acquires information about a candidate for remote connection destination from the device management server device 11.

(Outlined Processing of Information Processing System)

Figure 13:
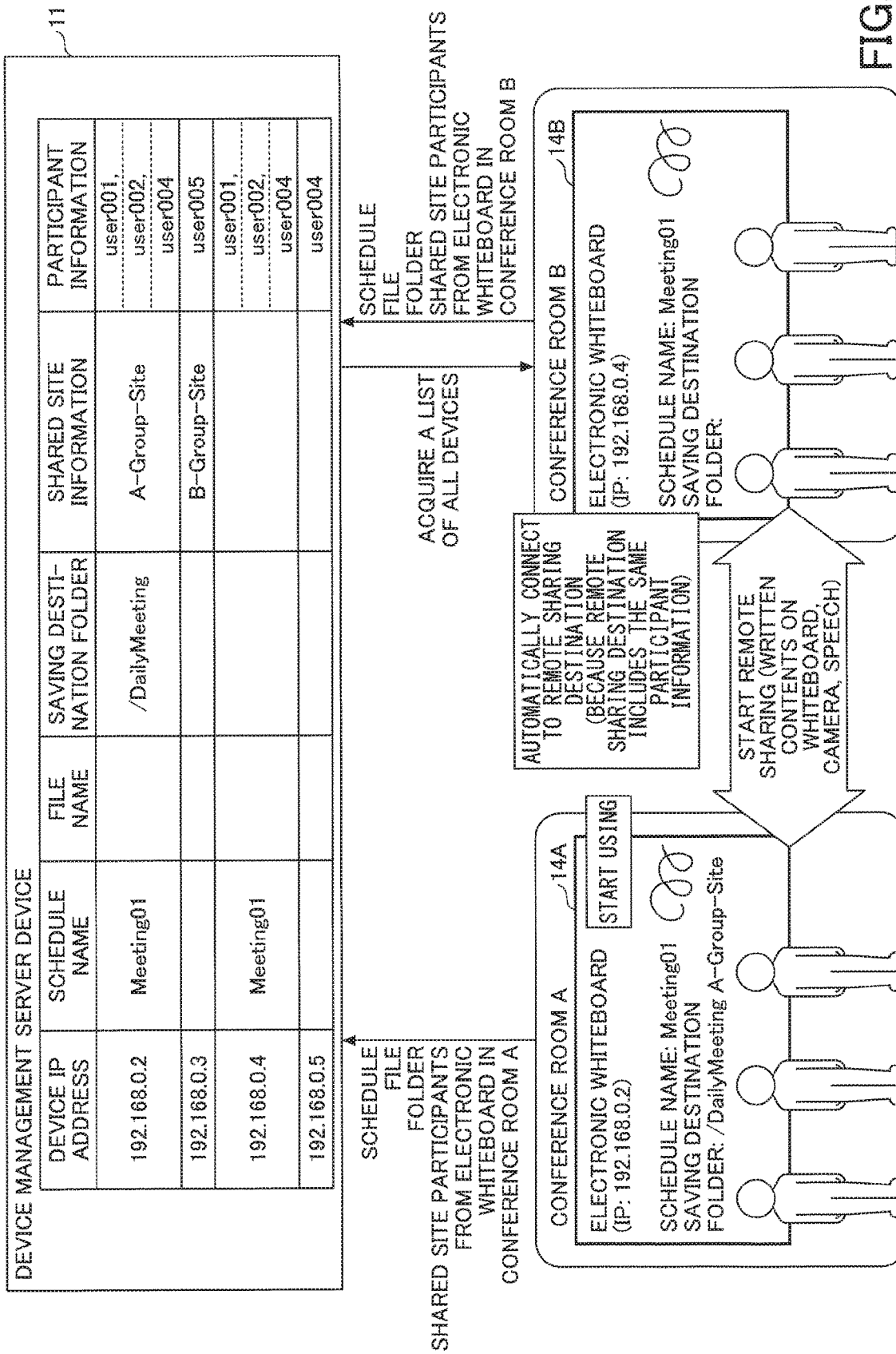
FIG. 13 is a diagram illustrating an outline of the information processing system according to an embodiment.

FIG. 13 is a diagram illustrating an example of an outlined processing of the information processing system according to one embodiment. FIG. 13 illustrates an example of remote sharing performed between an electronic whiteboard device 14A (a first electronic whiteboard device) installed in a "conference room A" and an electronic whiteboard device 14B (a second electronic whiteboard device) installed in a "conference room B". The electronic whiteboard devices 14A and 14B each have a function to remotely share written contents, camera images, microphone sound or speech, and the like between the electronic whiteboard devices 14A and 14B. Note that the function of remotely sharing of contents and the like between the electronic whiteboard devices 14 is possible, provided that the electronic whiteboard devices acting as a remote connection destination have an IP address.

The information processing system 1 according to an embodiment assumes that an electronic whiteboard device 14 configured to perform remote sharing utilizes the schedule service 42 or the file service 44 of the external service group system 12.

For example, multiple electronic whiteboard devices 14 that perform remote sharing have a function to prompt a user to select a schedule from the conference schedule information managed by the schedule service 42, and also have a function to read the attached file of the schedule selected from the conference schedule information. In addition, the multiple electronic whiteboard devices 14 that perform remote sharing have a function to prompt a user to select a file to be read from the file service 44 or from the shared site service 46, and also have a function to read the selected file. The multiple electronic whiteboard devices 14 that perform remote sharing include a function to prompt a user to select a webpage having a chat function, a whiteboard function, and the like, and also have a function to read the selected webpage. Further, the multiple electronic whiteboard devices 14 that perform remote sharing have a function to prompt a user to select a saving destination folder of the file service 44 or the shared site service 46 for storing a file of the written contents, and also have a function to store the file of the written contents in the selected saving destination folder.

As described above, information selected by the user of the electronic whiteboard device 14 (i.e., information relating to resources of the external service) is managed as the device management information by the device management server device 11 in association with an identifier of the electronic whiteboard device 14. Examples of the information selected by the user of the electronic whiteboard device 14 include conference schedule information, a file, a saving destination folder, and shared site information.

When performing remote sharing with other electronic whiteboard devices 14, the electronic whiteboard device 14 acting as a reference electronic whiteboard device 14 refers to the device management information managed by the device management server device 11, and searches for the other electronic whiteboard devices 14 that have the device management information indicating the same participant information as that indicated in the device management information for the reference electronic whiteboard device, as a candidate for remote connection destination. Likewise, the reference electronic whiteboard device 14 refers to the device management information, and searches for other electronic whiteboard devices 14 that have the device management information indicating the same resources as those indicated in the device management information for the reference electronic whiteboard device, as a candidate for remote connection destination. The reference electronic whiteboard device 14 then displays, to a user of the reference electronic whiteboard device, one or more of the other electronic whiteboard devices 14, which are found as a candidate for remote connection destination. Alternatively, the reference electronic whiteboard device 14 automatically and remotely connects to one or more of the other electronic whiteboard devices 14, which are found as a candidate for remote connection destination.

In the following example, the electronic whiteboard device 14A illustrated in FIG. 13 first selects conference schedule information, a file, a saving destination folder, and a shared site, and the electronic whiteboard device 14B subsequently selects the conference schedule information. A user of the electronic whiteboard device 14A selects the conference schedule information, file, saving destination folder, and shared site to start using the electronic whiteboard device 14A. In addition, the electronic whiteboard device 14A causes the device management server device 11 to manage the conference schedule information, file, saving destination folder, and shared site, which are selected by the user of the electronic whiteboard device 14A, in association with an IP address of the electronic whiteboard device 14A. In this example, it is assumed that there are no other electronic whiteboard devices 14 that have selected the same resources as those of the electronic whiteboard device 14A.

After the user starts using the electronic whiteboard device 14A, a user of the electronic whiteboard device 14B selects conference schedule information. The electronic whiteboard device 14B causes the device management server device 11 to manage the conference schedule information, which is selected by the user of the electronic whiteboard device 14B, in association with an IP address of the electronic whiteboard device 14B. In addition, the electronic whiteboard device 14B acquires the device management information from the device management server device 11.

Since participants "user001, user002, and user004" indicated in the device management information for the electronic whiteboard device 14B and participants "user001, user002, and user004" indicated in the device management information for the electronic whiteboard device 14A are the same, the electronic whiteboard device 14B displays the electronic whiteboard device 14A as a recommended remote connection destination to the user of the electronic whiteboard device 14B. Alternatively, the electronic whiteboard device 14B automatically and remotely connects to the electronic whiteboard device 14A.

In addition, since the schedule name "Meeting01" indicated in the device management information for the electronic whiteboard device 14B and the schedule name "Meeting01" indicated in the device management information for the electronic whiteboard device 14A are the same, the electronic whiteboard device 14B displays the electronic whiteboard device 14A as a recommended remote connection destination to the user of the electronic whiteboard device 14B. Alternatively, the electronic whiteboard device 14B automatically and remotely connects to the electronic whiteboard device 14A.

Note that in the example illustrated in FIG. 13, a participant "user004" is indicated in the device management information for a third electronic whiteboard device 14 having a device IP address "192.168.0.5". Accordingly, since the participant "user004" indicated in the device management information for the third electronic whiteboard device 14 is also indicated in the device management information for the electronic whiteboard device 14A, the third electronic whiteboard device 14 displays the electronic whiteboard device 14A to a user of the third electronic whiteboard device 14 as a recommended remote connection destination.

Alternatively, the third electronic whiteboard device 14 automatically and remotely connects to the electronic whiteboard device 14A. Note that there may be a case where a participant (e.g., "user 004"), who is included in the schedule (e.g., "Meeting01") selected by the electronic whiteboard device 14A, does not log into the electronic whiteboard device 14A but logs in to another electronic whiteboard device 14 (e.g., the third electronic whiteboard device 14). In such a case, the display unit 60C of the electronic whiteboard device 14A may display, to the user of the electronic whiteboard device 14A, the logged in third electronic whiteboard device 14 by being included in the candidates for remote connection destination to be connected by the electronic whiteboard device 14A. Accordingly, a candidate for remote connection destination (i.e., the logged in third electronic whiteboard device 14) to be remotely connected by the electronic whiteboard device 14A is displayed upon the conference participant's simply logging into the third electronic whiteboard device 14 without a schedule being selected by the electronic whiteboard device 14A. This will simplify a conference participant's connecting operation.

In addition, when a user uses an application of a terminal device (e.g., such as a user's personal PC) to log in with an ID and a password or the like, to perform remote sharing between one or more electronic whiteboard devices 14 and the terminal device, the terminal device may be included in the candidates for remote connection destination displayed by the electronic whiteboard device 14A.

In addition to the participants included in a schedule (e.g., "Meeting01") selected by the electronic whiteboard device 14A, a participant who is not included in the schedule (e.g., "Meeting01") but is authenticated by an IC card is added to the candidates for remote connection destination displayed by the electronic whiteboard device 14A. Further, when any one of the participants logs in from another electronic whiteboard device 14 or from the user's terminal device, another electronic whiteboard device 14 or the user's terminal device may also be included in the candidates for remote connection destination displayed by the electronic whiteboard device 14A.

Further, at the end of the conference, the device management information for all the connected electronic whiteboard devices 14 and terminal devices, and the device management information for the reference electronic whiteboard device within the device management server device 11 are reset or deleted based on an operation to end the conference. This enables only electronic whiteboard devices associated with the schedule (e.g., "Meeting01") or the participants to be determined as candidates for remote connection destination, and enables those electronic whiteboard devices unassociated with the schedule to be excluded from the candidates for remote connection destination.

The electronic whiteboard device 14A may also use resource information, in addition to the participant information that is associated with the schedule, to display, as a candidate for remote connection destination, other electronic whiteboard devices 14 and the like that have the same resources as the resources included in the schedule selected in the electronic whiteboard device 14A. Note the resource information used by the electronic whiteboard device 14A includes information about the utilized devices associated with a schedule, or information about a location of a conference room, and the like that are associated with the schedule. For example, there may be a case where multiple electronic whiteboard devices 14 are scheduled in a schedule, and another electronic whiteboard device 14, which acts as a remote connection destination and has been logged into by a user, is not scheduled in the schedule. In this case, although another electronic whiteboard device 14 is not included in the schedule, the electronic whiteboard device 14A may still be able to display another electronic whiteboard device 14 as a candidate for remote connection destination at the time of selecting the schedule. This is because another electronic whiteboard device 14 acting as a remote connection destination is added as resources associated with the schedule.

As described above, in the information processing system 1 according to an embodiment, another electronic whiteboard device 14 having device management information indicating the same participants as the participants indicated in the device management information for the reference electronic whiteboard device, and another electronic whiteboard device 14 having resources indicating the same participants as the participants indicated in the resources of the reference electronic whiteboard device may be displayed, to a user, as a recommended remote connection destination, or may be selected as a remote connection destination to be automatically connected by the reference electronic whiteboard device. This will reduce a user's workload.

Note that the display of the recommended remote connection destination to a user, or the selection of a remote connection destination to be automatically connected may be performed before or after the receiving of an instruction from a user to perform remote sharing.

(Flowchart of Remote Sharing Processing by Information Processing System 1)

Figure 14A:
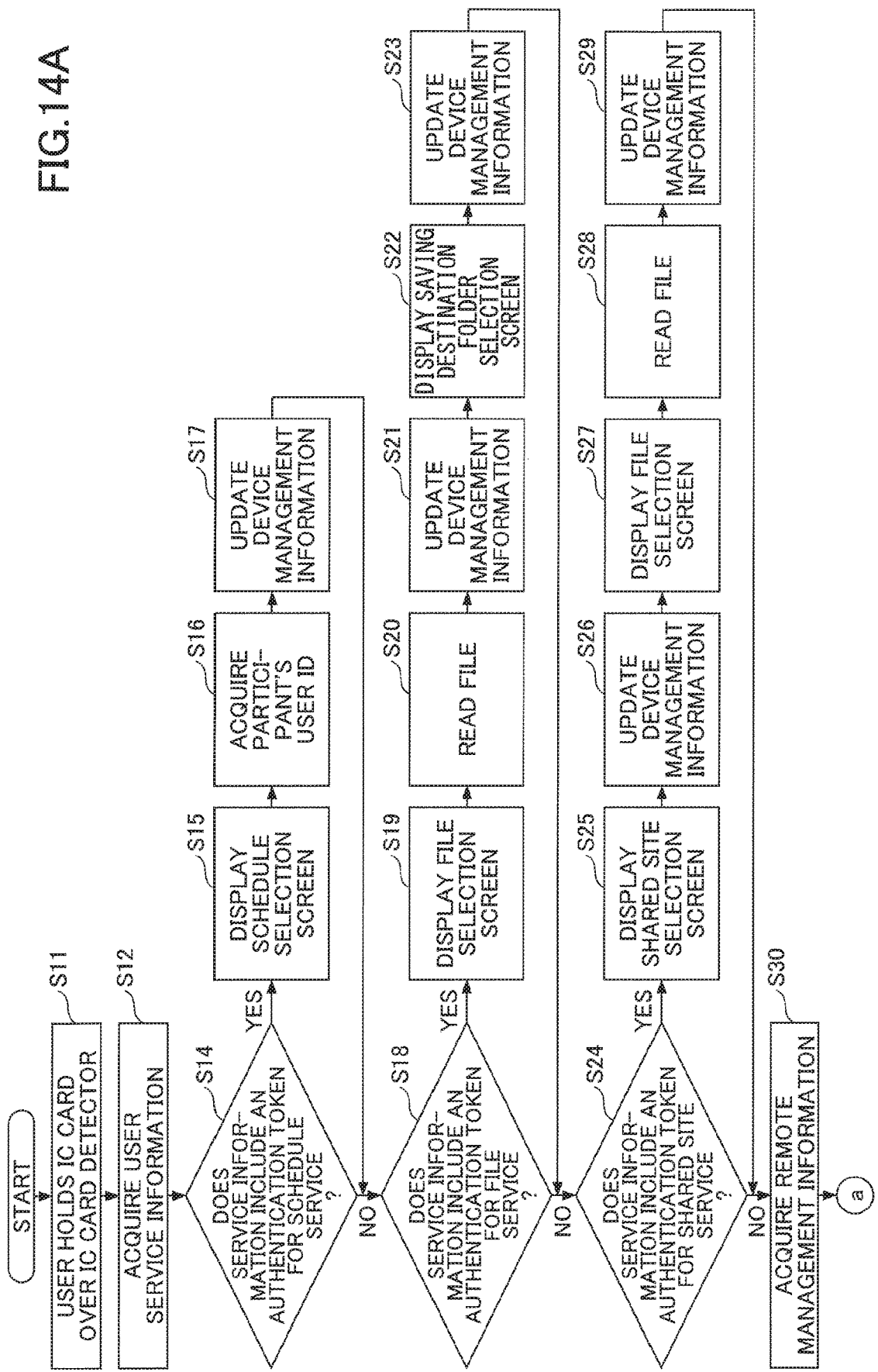
FIG. 14A is a flowchart illustrating an example of processing of an information processing system according to an embodiment.
Figure 14B:
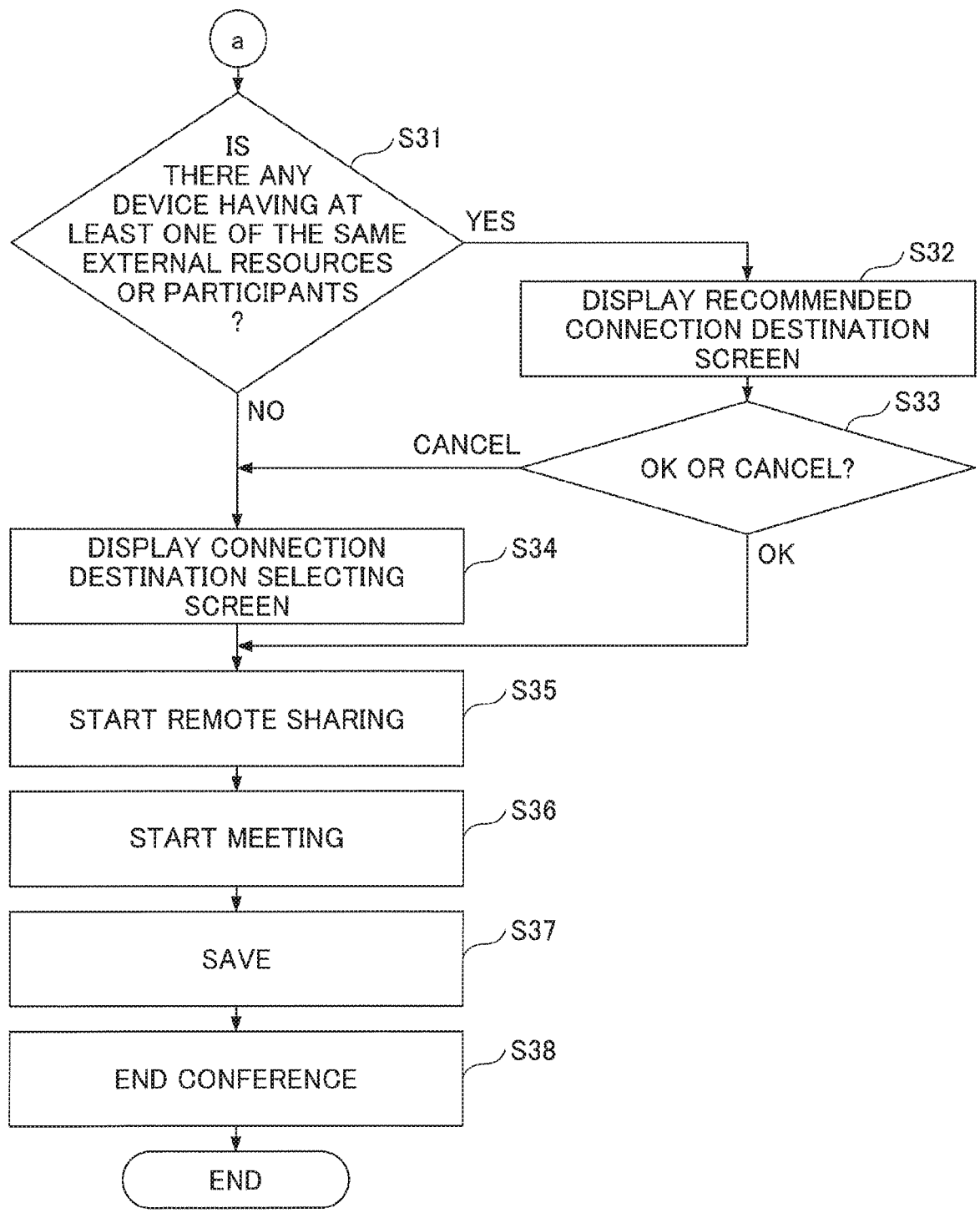
FIG. 14B is a flowchart of an example of processing of an information processing system according to an embodiment.

The following illustrates an example of processing from the start to the end of remote sharing performed by the information processing system 1. FIGS. 14A and 14B are flowcharts illustrating an example of processing performed in the information processing system 1 according to an embodiment. First, a user holds an IC card 630 to an IC card detector 64 (Step S11). In this step, the IC card detector 64 reads identification information from the user's IC card 630.

Next, a participant manager 56 transmits the identification information read by the IC card detector 64 to a user information server device 10, and acquires, from the user information server device 10, service information of the user corresponding to the identification information (Step S12).

For example, when the identification information acquired from the IC card 630 is "ICCARD-123", the user ID "user001" is specified from the user information list illustrated in FIG. 9, and service information illustrated in FIG. 15 is specified from the service information list illustrated in FIG. 10. FIG. 15 is a table illustrating an example of service information specified by the acquired identification information.

Next, the participant manager 56 transmits the user ID specified in Step S12 to the device management server device 11. In response, the device management server device 11 registers the user ID specified in Step S12 in the device management information corresponding to the electronic whiteboard device 14, from which the user ID was originally obtained (Step S13).

Next, when an authentication token for a schedule service 42 is included in the service information acquired in Step S12 (Step S14: Yes), the information processing system 1 performs processing from steps S15 to S17. Conversely, when the authentication token for the schedule service 42 is not included in the service information acquired in Step S12 (Step S14: No), the information processing system 1 skips processing from steps S15 to S17.

In Step S15, the conference schedule setting unit 50 displays a schedule selecting screen 1000 illustrated in FIG. 16, for example. FIG. 16 is a conceptual diagram illustrating an example of a schedule selecting screen. The schedule selecting screen 1000 illustrated in FIG. 16 is a screen for selecting a schedule of the conference schedule information with respect to a user who has been specified by the participant manager 56. Since the conference schedule information includes "organized time and duration", the schedule may be selected automatically based on the current time.

Next, in Step S16, the conference schedule setting unit 50 transmits the external service user IDs of respective participants indicated in the conference schedule information to the user information unit 20, and acquires user IDs of the participants' electronic whiteboard system corresponding to the external service user IDs, from the user information unit 20.

The conference schedule setting unit 50 then transmits, to the device management server device 11, the conference schedule information (schedule name, etc.) selected by the user from the schedule selecting screen of FIG. 16 or the conference schedule information automatically set by the time and the user's authentication information, the IP address of the reference electronic whiteboard device, and the user IDs of the participants' electronic whiteboard system acquired in Step S16. The device management server device 11 may then update the device management information of FIG. 11, for example (Step S17).

Next, when the authentication token for the file service 44 is included in the service information acquired in Step S12 (Step S18: Yes), the information processing system 1 performs processing in steps S19 to S23. Conversely, when the authentication token for the file service 44 is not included in the service information acquired in Step S12 (Step S18: No), the information processing system 1 skips processing of steps S19 to S23.

Figure 17:
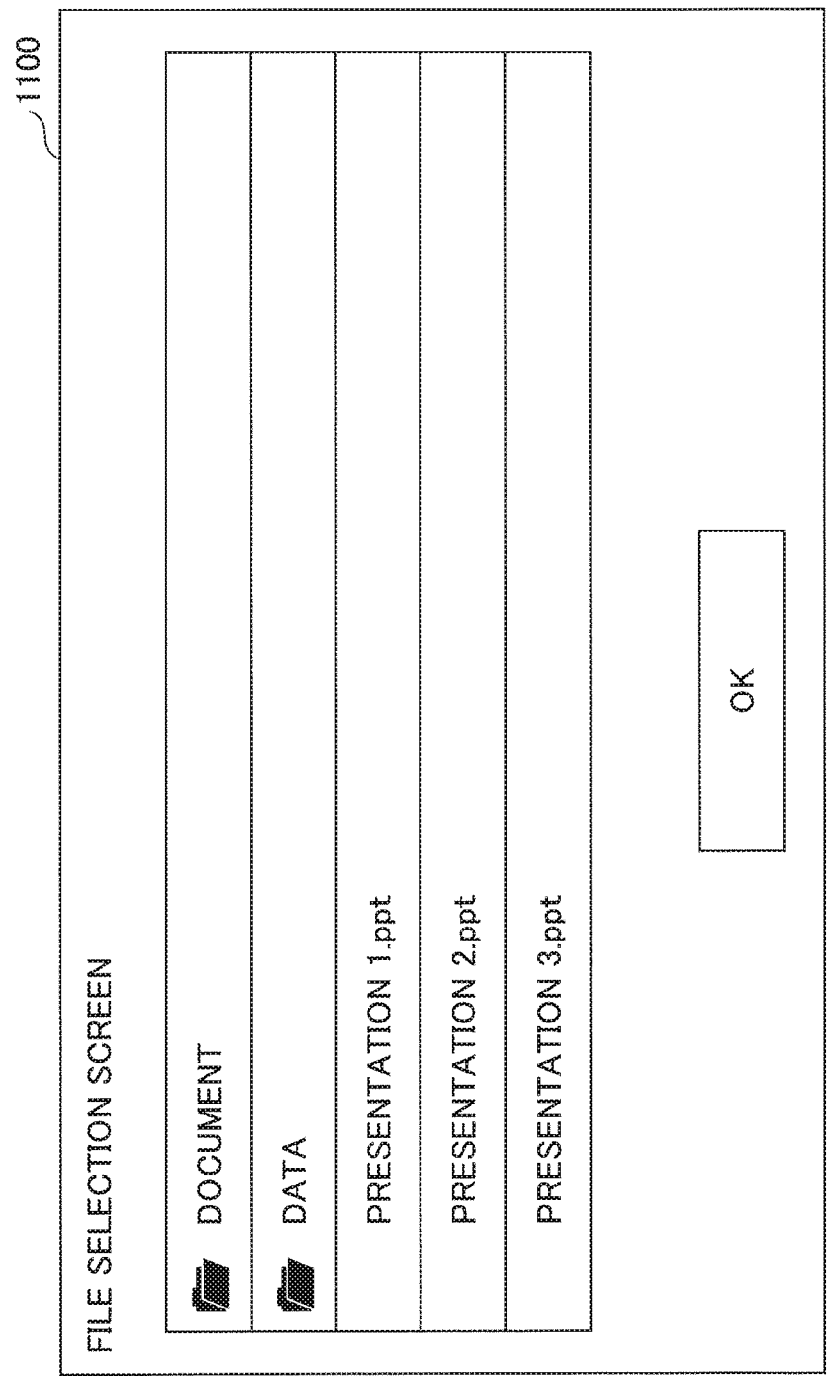
FIG. 17 is a conceptual diagram illustrating an example of a file selecting screen.

In Step S19, the file reader 52 displays a file selecting screen 1100 illustrated in FIG. 17, for example. FIG. 17 is a conceptual diagram illustrating an example of a file selecting screen. The file selecting screen 1100 illustrated in FIG. 17 is a screen via which a user who has been identified by the participant manager 56 selects a file of the owner user.

Next, the file reader 52 acquires, from the file service 44, the file selected by the user via the file selecting screen of FIG. 17. The file reader 52 displays the acquired file on the whiteboard display unit 58 (Step S20). The file reader 52 transmits the information of the file (file name, etc.) and the IP address of the reference electronic whiteboard device to the device management server device 11. The device management server device 11 then updates the device management information illustrated in FIG. 11 (Step S21).

Figure 18:
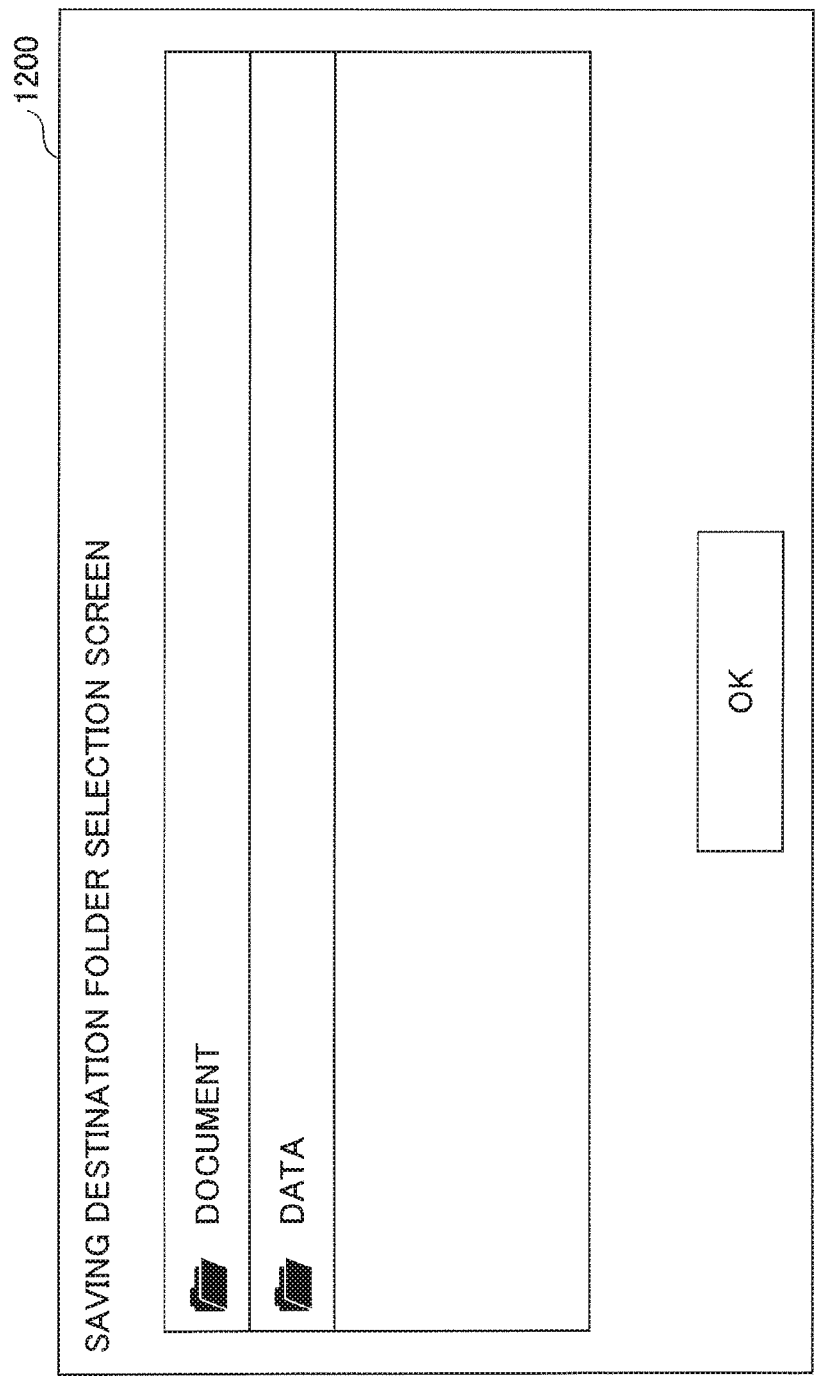
FIG. 18 is a conceptual diagram illustrating an example of a saving destination folder selecting screen.

Next, the file transmitter 54 displays a saving destination folder selecting screen 1200 illustrated in FIG. 18 (Step S22). FIG. 18 is a conceptual diagram illustrating an example of a saving destination folder selecting screen 1200. The saving destination folder selecting screen 1200 illustrated in FIG. 18 is a screen on which a user who has been identified by the participant manager 56 selects a folder of the owner user.

The file reader 52 transmits information (e.g., a folder path) of the folder selected from the saving destination folder selecting screen 1200 of FIG. 18, and the IP address of the reference electronic whiteboard device to the device management server device 11, and the device management server device 11 updates the device management information of FIG. 11 (Step S23).

Next, when the service information acquired in Step S12 includes the authentication token for the shared site service 46 (Step S24: Yes), the information processing system 1 performs processing in steps S25 to S29. When the authentication token for the shared site service 46 is not included in the service information acquired in Step S12 (Step S24: No), the information processing system 1 skips processing of steps S25 to S29.

Figure 19:
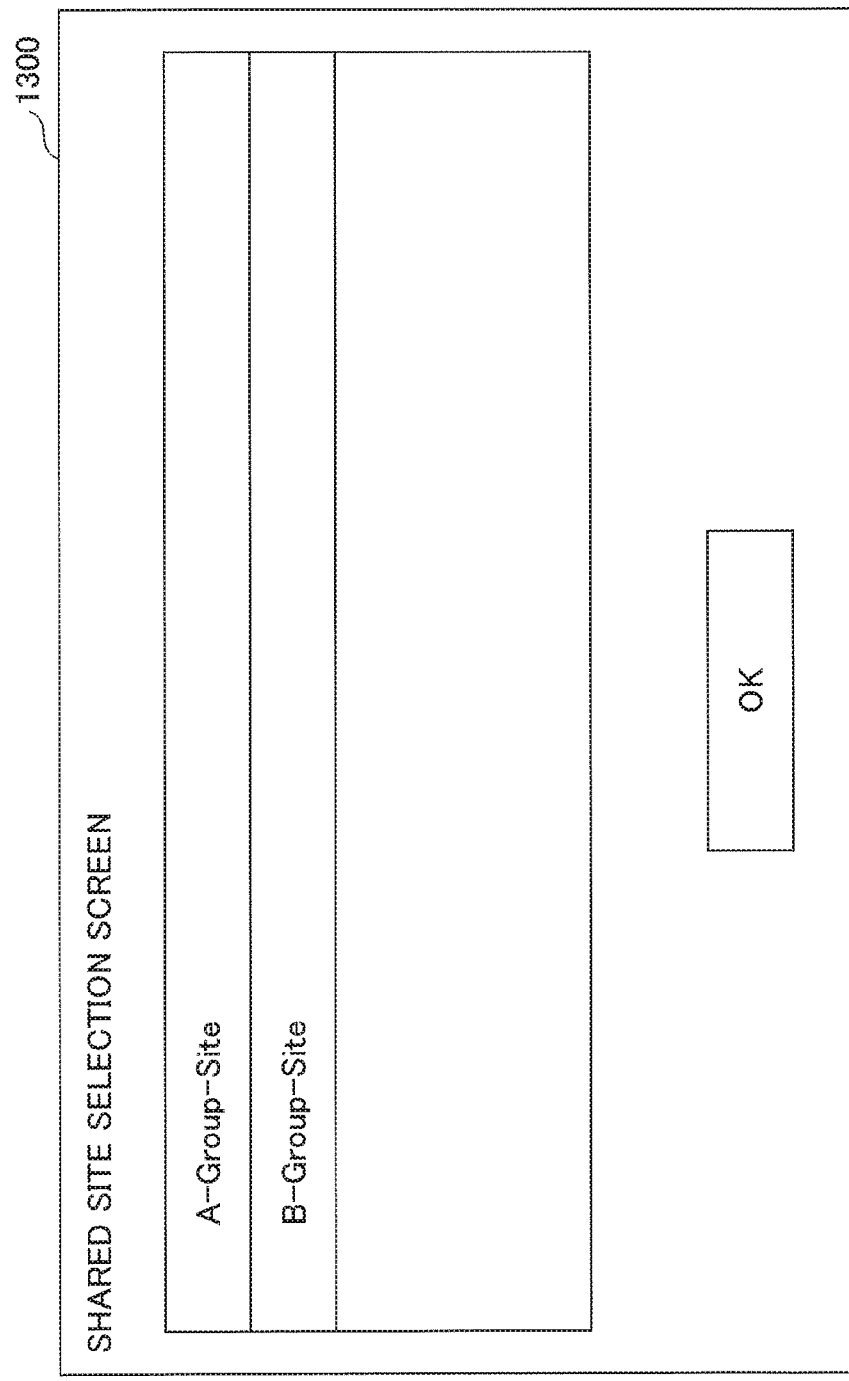
FIG. 19 is a conceptual diagram illustrating an example of a shared site selecting screen.

In Step S25, the shared site reader 55 displays the shared site selecting screen 1300 illustrated in FIG. 19, for example. FIG. 19 is a conceptual diagram illustrating an example of the shared site selecting screen. The shared site selecting screen 1300 illustrated in FIG. 19 is a screen on which a user who has been identified by the participant manager 56 selects the shared site available to the user.

Next, the shared site reader 55 transmits information (a site name, etc.) of the shared site selected from the shared site selecting screen of FIG. 19 and the IP address of the reference electronic whiteboard device to the device management server device 11. The device management server device 11 then updates the device management information of FIG. 11 (Step S26).

Next, the shared site reader 55 displays the file selecting screen 1100 illustrated in FIG. 17 (Step S27). The file selecting screen 1100 illustrated herein is a screen on which the user who has been identified by the participant manager 56 selects a file of the shared site available to the user.

Next, in Step S28, the shared site reader 55 acquires, from the shared site service 46, the file selected by the user via the file selecting screen of FIG. 17. The shared site reader 55 displays the file acquired from the shared site service 46 on the whiteboard display unit 58. The shared site reader 55 transmits information of the file (a file name, etc.) and the IP address of the reference electronic whiteboard device to the device management server device 11. The device management server device 11 then updates the device management information of FIG. 11 (Step 29).

The remote destination connecting unit 60 acquires the device management information of FIG. 11 from the device manager 30 of the device management server device 11 (Step S30).

The remote destination connecting unit 60 compares external resources and participant information of the device management information for the reference electronic whiteboard device with external resources and participant information of the device management information for another electronic whiteboard device 14.

The remote destination connecting unit 60 then determines whether there is another electronic whiteboard device 14 that includes at least one of the same external resources or at least one of the same participant information as those of the reference electronic whiteboard device 14 (Step S31).

Upon determining that there is any of the other electronic whiteboard devices 14 that includes at least one of the same external resources or at least one of participant information (Step S31: Yes), the display unit 60C displays the recommended connection destination screen 1400 illustrated in FIG. 20 (Step S32).

Figure 20:
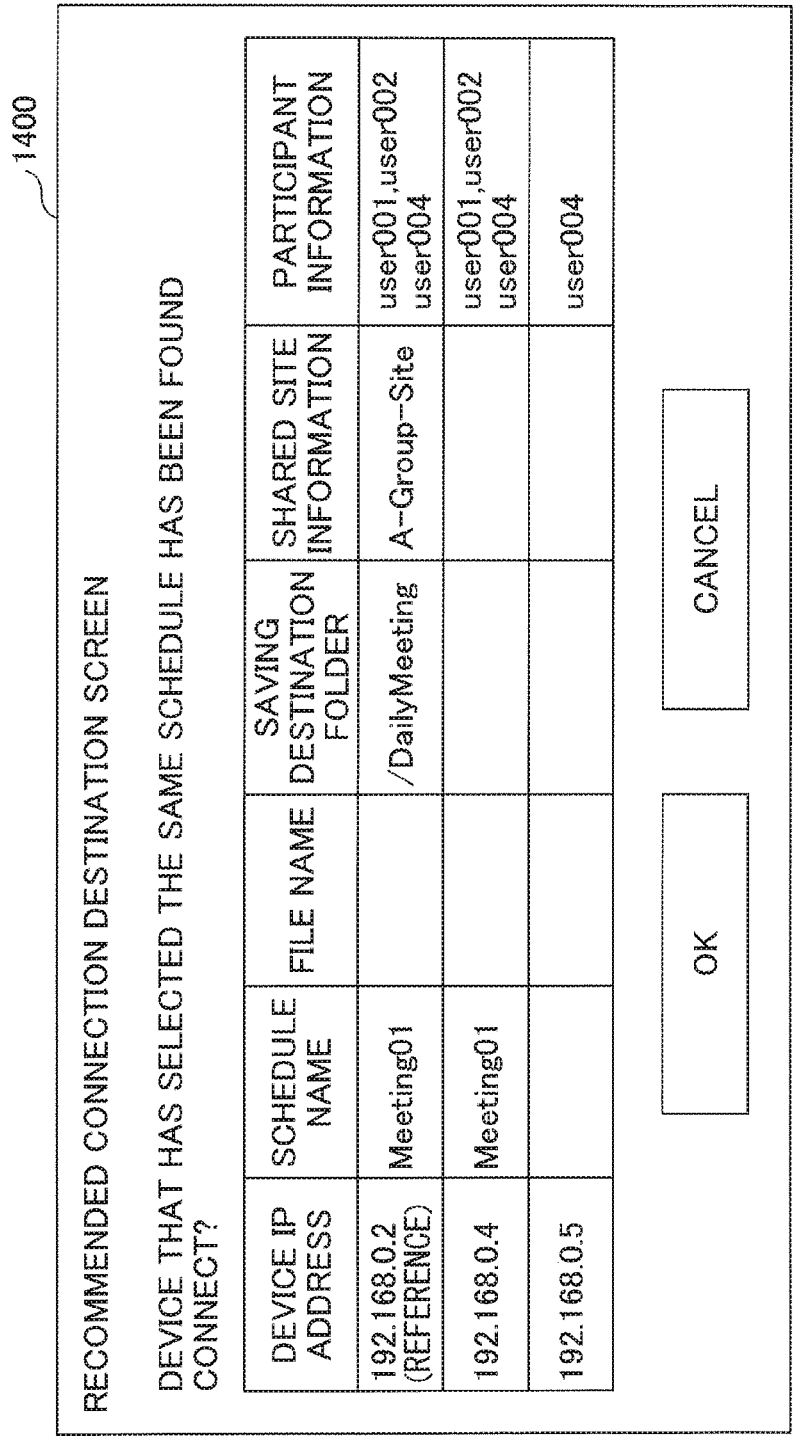
FIG. 20 is a conceptual diagram illustrating an example of a recommended connection destination selecting screen.
Figure 22A:
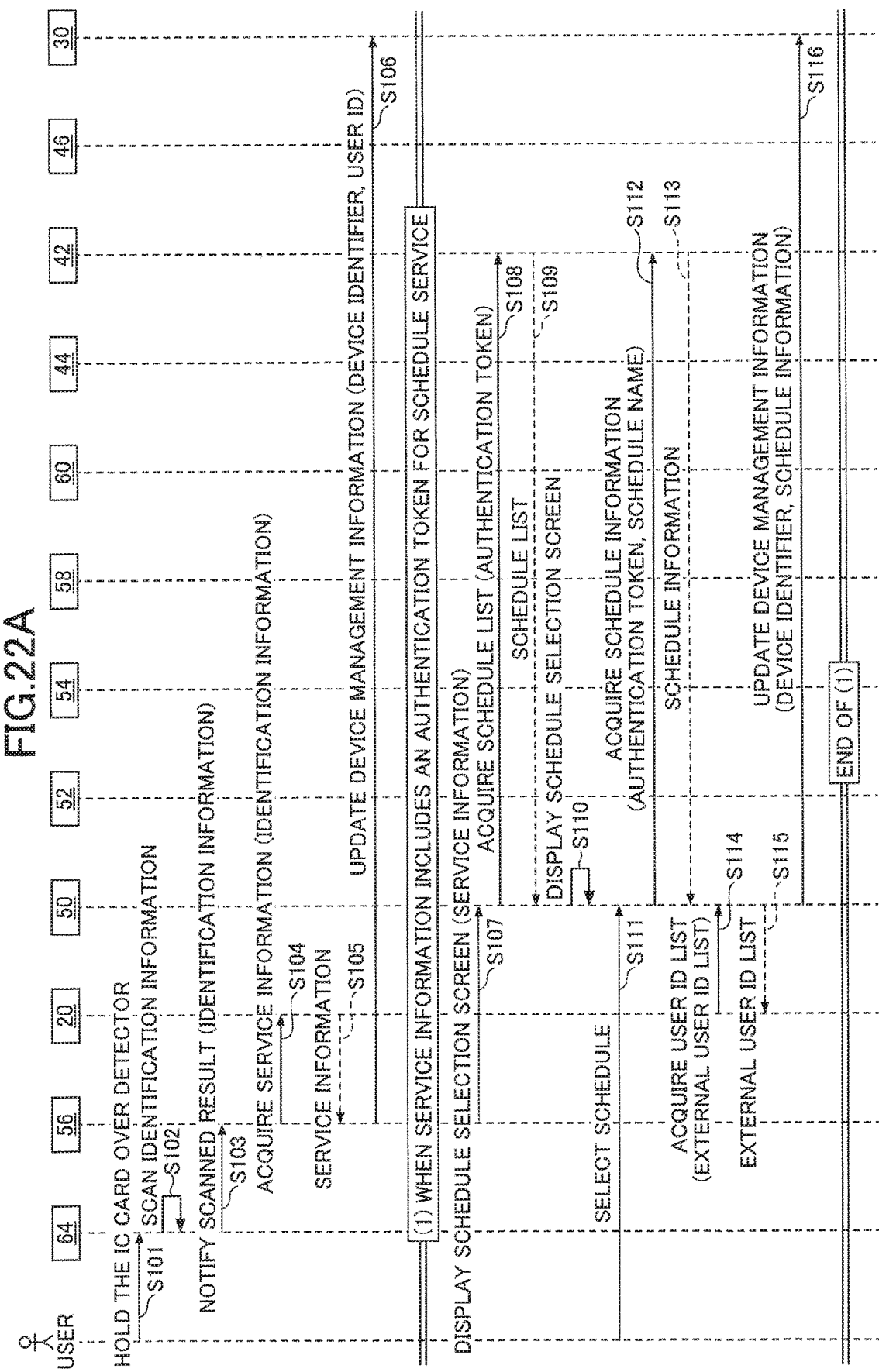
FIG. 22A is a sequence diagram illustrating an example of processing of an information processing system according to an embodiment.

FIG. 20 is a conceptual diagram illustrating an example of a recommended connection destination screen. The recommended connection destination screen 1400 illustrated in FIG. 20 is a screen, which displays, to the user, one or more other electronic whiteboard devices 14 as a recommended remote connection destination. The recommended electronic whiteboard devices 14 each have at least one of the external resources or at least one of participant information that are the same as the external resources or participant information included in the reference electronic whiteboard device 14.

FIG. 20 illustrates an example of the recommended connection destination screen 1400 displayed by the reference electronic whiteboard device 14 having an IP address "192.168.0.2". In this recommended connection destination screen 1400, an electronic whiteboard device 14 having an IP address "192.168.0.4" and an electronic whiteboard device 14 having an IP address "192.168.0.5" are recommended as remote connection destinations.

In the electronic whiteboard device 14 having an IP address "192.168.0.4", the same participants "User001, User002, User004" as those of the reference electronic whiteboard device 14 having an IP address "192.168.0.2" are included in the logged in users. Thus, the electronic whiteboard device 14 having an IP address "192.168.0.4" is recommended as a remote connection destination.

Likewise, in the electronic whiteboard device 14 having the IP address "192.168.0.4", the same schedule name "Meeting01" as that of the reference electronic whiteboard device 14 having the IP address "192.168.0.2" is selected as resources to be used for remote sharing. Thus, the electronic whiteboard device 14 having the IP address "192.168.0.4" is recommended as a remote connection destination.

Further, in another electronic whiteboard device 14 having an IP address "192.168.0.5", the same participant "User 004" as that of the reference electronic whiteboard device 14 having the IP address "192.168.0.2" is included in the logged in users. Thus, another electronic whiteboard device 14 having an IP address "192.168.0.5" is also recommended as a remote connection destination.

When "OK" is selected in the recommended connection destination screen 1400 (Step S33: OK), the connecting unit 60D remotely connects to another electronic whiteboard device 14, which is recommended in the recommended connection destination screen 1400, and the reference electronic whiteboard device starts remote sharing with the recommended electronic whiteboard device 14 (Step S35). As a result, the meeting between participants of the reference electronic whiteboard device and participants of other electronic whiteboard devices 14 is started (Step S36). In this meeting, written contents, camera images, and microphone sound or speech are remotely shared. Thereafter, the information processing system 1 progresses processing to Step S37.

In Step S31, when the determining unit 60B determines that "there are no other electronic whiteboard devices 14 that have at least one of the external resources or at least one of participants that are the same as the external resources or participants as those of the reference electronic whiteboard device 14" (Step S31: No), and when "cancel" is selected in the recommended connection destination screen 1400 (Step S33: Cancel), the display unit 60C displays the connection destination selecting screen 1500 illustrated as an example in FIG. 21 (Step S32).

FIG. 21 is a conceptual diagram illustrating an example of the connection destination selecting screen 1500. The connection destination selecting screen 1500 illustrated in FIG. 21 is a screen for prompting a user to select desired one or more electronic whiteboard devices 14 from among the multiple other electronic whiteboard devices 14 other than the reference electronic whiteboard device 14.

When "OK" is selected on the connection destination selecting screen 1500 in a state where the desired one or more (two in the example of FIG. 21) of the other electronic whiteboard devices 14 are selected, the connecting unit 60D of the reference electronic whiteboard device remotely connects to the selected one or more electronic whiteboard devices 14 selected on the connection destination selecting screen 1500, and starts remote sharing with the selected one or more electronic whiteboard devices 14 (Step S35). As a result, the meeting between the participants of the reference electronic whiteboard device and the participants of the other electronic whiteboard devices 14 is started (Step S36). In this meeting, written contents, camera images, and microphone sound or speech are shared remotely. Thereafter, the information processing system 1 progresses processing to Step S37.

In Step S37, the file transmitter 54 stores a file of the written contents in the saving destination folder selected on the saving destination folder selecting screen 1200 in FIG. 18. For example, when a user presses a conference end button, the remote sharing performed by the information processing system 1 ends (Step S38). In this step, the participant manager 56 resets the device management information for the reference electronic whiteboard device by transmitting an update instruction to the device management server device 11. The reset of the device management information, for example, is a process of clearing the values of the schedule name, file name, saving destination folder, and shared site information of the device management information. The participant manager 56 instructs the whiteboard display unit 58 to clear the displayed contents. The electronic whiteboard device 14 performs a logoff process of a user who has logged in with the IC card 630. The electronic whiteboard device 14 may further switch the reference electronic whiteboard device to a sleep state or a power off state.

Note that a method of recommending a remote connection destination is not limited to the method using the recommended connection destination screen 1400 illustrated in FIG. 20. For example, the recommended remote connection destinations may be indicated on the connection destination selecting screen 1500 illustrated in FIG. 21. In this case, as illustrated in FIG. 21, the recommended remote connection destinations may be displayed in a state where the recommended remote connection destinations have been already selected or in a state where the recommended remote connection destinations are displayed in order of priority.

(Sequence of Remote Sharing Processing by Information Processing System 1)

Next, processing from the start to the end of remote sharing by the information processing system 1 will be described using a sequence diagram. FIG. 22A to 22D are sequence diagrams illustrating an example of processing of an information processing system according to an embodiment.

<Step S101 to S106>

First, a user holds the IC card 630 over the IC card detector 64 of an electronic whiteboard device (Step S101). The IC card detector 64 then reads identification information from the IC card 630 (Step S102).

Next, in Step S103, the IC card detector 64 notifies the participant manager 56 of the identification information read from the IC card 630. In Step S104, the participant manager 56 transmits the notified identification information to the user information server device 10, and requests the user information server device 10 to provide service information. As a result, the participant manager 56 acquires the service information of the user corresponding to the notified identification information, from the user information unit 20 of the user information server device 10 (Step S105).

The participant manager 56 transmits a user ID corresponding to the notified identification information and an identifier of the electronic whiteboard device, such as the IP address to the device manager 30 of the device management server device 11. The participant manager 56 then registers the user ID corresponding to the identifier in the device management information (Step S106).

<Step S107 to S116>

When the service information acquired in Step S105 includes an authentication token for the schedule service 42, the information processing system 1 performs processing in steps S107 to S116. Conversely, when the authentication token for the schedule service 42 is not included in the service information acquired in Step S105, the information processing system 1 skips processing of steps S107 to S116.

In Step S107, the participant manager 56 transmits the service information acquired in Step S105 to the conference schedule setting unit 50 and requests the conference schedule setting unit 50 to display the schedule selecting screen. In Step S108, the conference schedule setting unit 50 requests the schedule service 42 to acquire a list of schedules by using the authentication token for the external service included in the received service information. As a result, in Step S109, the conference schedule setting unit 50 acquires the list of schedules transmitted from the schedule service 42. The acquired list of schedules is a schedule list (of the conference schedule information) in association with a user who has held the IC card 630 over the IC card detector 64 of the electronic whiteboard device. In Step S110, the conference schedule setting unit 50 displays the schedule selecting screen 1000 (see FIG. 16) including contents of the schedule list acquired in Step S109.

Thereafter, when the user selects a desired schedule from the schedule selecting screen 1000 (Step S111), the conference schedule setting unit 50 requests the schedule service 42 to acquire the conference schedule information, by using the authentication token for the external service, which is included in the service information acquired in Step S105, and the schedule name of the schedule selected in Step S111 (Step S112). As a result, the conference schedule setting unit 50 acquires the conference schedule information (i.e., conference schedule information in association with the user who has held the IC card 630 over the IC card detector 64) transmitted from the schedule service 42 (Step S113).

Subsequently, the conference schedule setting unit 50 transmits the external service user IDs of the participants displayed in the conference schedule information acquired in Step S113 to the user information unit 20 (Step S114). As a result, in Step S115, the conference schedule setting unit 50 acquires a list of user IDs transmitted from the user information unit 20 (i.e., the respective participants' user IDs of the electronic whiteboard system).

Subsequently, the conference schedule setting unit 50 transmits the identification of the electronic whiteboard device, the schedule information acquired in Step S113, and the list of user IDs acquired in Step S115 to the device manager 30 of the device management server device 11. As a result, the device manager 30 performs updating processing of the device management information using the information (Step S116).

<Step S117 to S129>

When the service information acquired in Step S105 includes the authentication token for the file service 44, the information processing system 1 performs processing in steps S117 to S129. Conversely, when the authentication token for the file service 44 is not included in the service information acquired in Step S105, the information processing system 1 skips processing of steps S117 to S129.

In Step S117, the participant manager 56 transmits the service information acquired in Step S105 to the file reader 52 and requests the file reader 52 to display the file selecting screen 1100. In Step S118, the file reader 52 requests the file service 44 to acquire a folder and file list using the authentication token for the external service included in the received service information. As a result, in Step S119, the file reader 52 acquires a folder and file list of the user transmitted from the file service 44. In Step S120, the file reader 52 displays the file selecting screen 1100 (see FIG. 17), which includes the folder and file list of the user acquired in Step S119.

Thereafter, when the user selects a desired file from the file selecting screen 1100 (Step S121), the file reader 52 requests the file service 44 to acquire the file selected by the user using the authentication token for the external service, which is included in the service information acquired in Step S105, and a folder path and a file name of the file selected in Step S121 (Step S122). As a result, in Step S123, the file reader 52 acquires the file transmitted from the file service 44. In Step S124, the file reader 52 displays the file acquired in Step S123 on the whiteboard display unit 58.

Subsequently, the file reader 52 transmits the identifier of the electronic whiteboard device and the file name of the file acquired in Step S123 to the device manager 30 of the device management server device 11. As a result, the device manager 30 performs updating processing of the device management information using the above information (Step S125).

Subsequently, in Step S126, the file reader 52 notifies the file transmitter 54 of the folder and file list of the user acquired in Step S119. In Step S127, the file transmitter 54 displays the saving destination folder selecting screen 1200 (see FIG. 18), which includes the received user's folder and file list.

Thereafter, when the user selects a desired folder from the saving destination folder selecting screen 1200 (Step S128), the file transmitter 54 transmits the identifier of the electronic whiteboard device and the folder name of the folder selected in Step S128 to the device manager 30 of the device management server device 11, thereby causing the device manager 30 to perform updating processing of the device management information using the above information (Step S129).

<Step S130 to S143>

When the service information acquired in Step S105 includes the authentication token for the shared site service 46, the information processing system 1 performs processing in steps S130 to S143. Conversely, when the authentication token for the shared site service 46 is not included in the service information acquired in Step S105, the information processing system 1 skips processing of steps S130 to S143.

In Step S130, the participant manager 56 transmits the service information acquired in Step S105 to the shared site reader 55 and requests the shared site reader 55 to display the shared site selecting screen 1300. In Step S131, the shared site reader 55 requests the shared site service 46 to acquire the shared site list using the authentication token for the external service included in the received service information. As a result, in Step S132, the shared site reader 55 acquires the list of the shared sites transmitted from the shared site service 46. In Step S133, the shared site reader 55 displays the shared site selecting screen 1300 (see FIG. 19), which includes a list of the shared sites acquired in Step S132.

Thereafter, when the user selects a desired shared site from the shared site selecting screen 1300 (Step S134), the shared site reader 55 sends the identifier of the electronic whiteboard device and the shared site name of the shared site selected in Step S134 to the device manager 30 of the device management server device 11, thereby causing the device manager 30 to perform updating processing of the device management information using the above information (Step S135).

In Step S136, the shared site reader 55 requests the shared site service 46 to acquire a folder and file list by using the authentication token for the external service included in the received service information and the shared site name of the shared site selected in Step S134. As a result, in Step S137, the shared site reader 55 acquires the folder and file list transmitted from the shared site service 46. In Step S138, the shared site reader 55 displays the file selecting screen 1100 (see FIG. 17), which includes the folder and file list acquired in Step S137.

Thereafter, when the user selects a desired file from the file selecting screen 1100 (Step S139), the shared site reader 55 requests the shared site service 46 to acquire the file selected by the user by using the authentication token for the external service included in the received service information, and the folder path and file name of the file selected in Step S139 (Step S140). As a result, in Step S141, the shared site reader 55 acquires the file transmitted from the shared site service 46. In Step S142, the shared site reader 55 displays the file acquired in Step S141 on the whiteboard display unit 58.

Thereafter, the shared site reader 55 transmits the identifier of the electronic whiteboard device and the file name of the file acquired in Step S141 to the device manager 30 of the device management server device 11. As a result, the device manager 30 performs updating processing of the device management information using the above information (Step S143).

<Steps S144 to S146>

Next, in Step S144, the file reader 52 requests the device manager 30 of the device management server device 11 to acquire the device management information. As a result, in Step S145, the file reader 52 acquires remote management information transmitted from the device manager 30. In Step S146, the file reader 52 notifies the remote destination connecting unit 60 of the remote management information acquired in Step S145.

The remote destination connecting unit 60 compares external resources and participant information of the device management information for the electronic whiteboard device (as a reference electronic whiteboard device) with external resources and participant information of the device management information for other electronic whiteboard devices 14 to determine whether there are any of the other electronic whiteboard devices 14 that match at least one of the external resources or at least one of the participant information of the reference electronic whiteboard device.

<Steps S147 to S148>

In Step S147, when it is determined that "there are one or more electronic whiteboard devices 14 that matches at least one of the external resources and the participant information", the remote destination connecting unit 60 displays the recommended connection destination screen 1400. In Step S148, the remote destination connecting unit 60 receives the selection of "OK" or "Cancel" from the user on the recommended connection destination screen 1400.

<Step S149 to S150>

Conversely, in Step S149, when it is determined that "there are no other electronic whiteboard devices 14 that match at least one of the external resources and the participant information", or when "Cancel" is selected on the recommended connection destination screen 1400, the remote destination connecting unit 60 displays the connection destination selecting screen 1500. In Step S150, the remote destination connecting unit 60 receives the selection of one or more remote connection destinations by the user on the connection destination selecting screen 1500.

<Step S151 to S159>

Subsequently, in Step S151, the remote destination connecting unit 60 remotely connects to one or more remote connection destinations recommended on the recommended connection destination screen 1400 or one or more remote connection destinations selected on the connection destination selecting screen 1500, thereby starting remote sharing with the remote connection destinations.

In Step S152, when remote sharing is started in Step S151, the whiteboard display unit 58 receives writing input from the user. When the file transmitter 54 receives, from the user, a request for storing the written contents (Step S153), the file transmitter 54 requests the whiteboard display unit 58 to acquire the written contents (Step S154). As a result, in Step S155, the file transmitter 54 acquires a file of the written contents from the whiteboard display unit 58. In Step S156, the file transmitter 54 stores the file acquired in Step S155 in the saving destination folder (i.e., the saving destination folder selected on the saving destination folder selecting screen 1200) of the file service 44.

Thereafter, when the user ends the conference (Step S157), the participant manager 56 requests the device manager 30 of the device management server device 11 to reset the device management information and causes the device manager 30 to reset the device management information for the reference electronic whiteboard device (Step S158). In Step S159, the participant manager 56 instructs the whiteboard display unit 58 to discard the display contents.

According to the present embodiment, an information processing system 1 including a reference electronic whiteboard device and multiple other electronic whiteboard devices 14 is provided. In the information processing system 1, one or more of the other electronic whiteboard devices 14 having the device management information that includes the same participant information as that of the reference electronic whiteboard device, and one or more of the other electronic whiteboard devices 14 having the device management information that includes the same resources as those of the reference electronic whiteboard device may be displayed to a user as a recommended remote connection destination, or may be selected as a remote connection destination to be automatically connected by the reference electronic whiteboard device. The information processing system having such a configuration may be enabled to reduce a user's workload.

The present invention is not limited to the above specifically disclosed embodiments, and various modifications and variations are possible without departing from the scope of the claims. The information processing system 1 described in the present embodiment is merely an example, and it is obvious that various system configuration examples may be provided in accordance with application or purpose.

The "information processing device" of the present invention is not restricted to an electronic whiteboard device and may be any devices that are capable of remote sharing. The "information processing device" of the present invention may be, for example, a PJ (Projector), an IWB (Interactive Whiteboard), an output device such as a digital signage, an HUD (Head Up Display) device, an industrial machine, an imaging device, a sound collector, a medical device, a network home appliance, a Personal Computer, a cellular phone, a smartphone, a tablet terminal, a game machine, a PDA (Personal Digital Assistant), a digital camera, a wearable PC or a desktop PC, or the like.

The functions of the embodiments described above may also be implemented by one or more processing circuits. As used herein, a "processing circuit" includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

In the above-described embodiment, although a schedule service 42 or the like is provided from the external service group system 12, the present invention is not limited to this example. For example, an internal service group system may be provided by the same company together with the user information server device 10, the device management server device 11, and the electronic whiteboard device 14, and a service group such as the schedule service 42 may be provided by the internal service group system. In this case, it is not necessary to separate the service group such as the schedule service 42 from the user identification information (user ID) used in the user information server device 10, and the entire electronic whiteboard system including the schedule service 42 may be managed with the same user ID.

According to an embodiment of the present invention, an information processing device capable of reducing a user's workload in selecting another information processing device as a remote connection destination in remote sharing is provided.

Advantageous Effects of Invention

According to an embodiment of the present invention, a user's workload in terms of selecting another information processing devices as a remote connection destination may be reduced.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

What is claimed is:

1. An information processing device capable of remote sharing with one or more of other information processing devices, the information processing device acting as a reference information processing device, the information processing device comprising:
   a memory; and
   one or more processors coupled to the memory and configured to
   acquire device management information of the one or more of the other information processing devices, the device management information of the one or more of the other processing devices include participant information;
   compare device management information of the reference information processing device with the device management information of the one or more of the other information processing devices;
   display one or more of the other information processing devices as a candidate for remote connection when the compare determines that the participant information of the device management information of the reference information processing device corresponds to the participant information of the device management information of the one or more of the other information processing devices;
   prompt a user of the reference information processing device to select at least one of the one or more of the other information processing devices displayed as a candidate for remote connection; and
   remotely connect the reference information processing device to the selected at least one of the one or more of the other information processing devices.

2. The information processing device according to claim 1, wherein the processors are configured to:
   display another information processing device by being included in the one or more of the other information processing devices as a candidate for remote connection with respect to the reference information processing device, in response to a participant logging into the another information processing device and not logging into the reference information processing device, the logged in participant being included in a schedule selected in the reference information processing device.

3. The information processing device according to claim 1, wherein the processors are configured to:
   display, to the user of the reference information processing device, a screen indicating the one or more of the other information processing devices determined as a candidate for remote connection.

4. The information processing device according to claim 3, wherein the processors are configured to:
displaying the screen indicating the one or more of the other information processing devices determined as a candidate for remote connection such that participants who use the one or more of the other information processing devices are identifiable to the user of the reference information processing device.

5. The information processing device according to claim 3, wherein the processors are configured to:
remotely connect the reference information processing device to the one or more of the other information processing devices, in response to the user of the reference information processing device performing a predetermined authorization operation with respect to the one or more of the other information processing devices displayed as a candidate for remote connection.

6. The information processing device according to claim 1, wherein the processors are configured to:
automatically and remotely connect to the one or more of the other information processing devices determined as a candidate for remote connection.

7. The information processing device according claim 1, wherein the processors are configured to:
display the one or more of the other information processing devices as a candidate for remote connection, the one or more of the other information processing devices using same resources as resources used by the reference information processing device in the remote sharing.

8. The information processing device according to claim 7, wherein the resources indicate at least one of a schedule, a file, a saving destination folder for saving a file, and a shared site.

9. An information processing system comprising:
a plurality of information processing devices capable of remote sharing with each other by remote connection, the plurality of information processing devices including at least one reference information processing device and one or more of other information processing devices, wherein the at least one reference information processing device includes
a memory; and
one or more processors coupled to the memory and configured to
acquire device management information of the one or more of the other information processing devices, the device management information of the one or more of the other processing devices include participant information;
compare device management information of the at least one reference information processing device with the device management information of the one or more of the other information processing devices;
display one or more of the other information processing devices as a candidate for remote connection when the compare determines that the participant information of the device management information of the at least one reference information processing device corresponds to the participant information of the device management information of the one or more of the other information processing devices;
prompt a user of the at least one reference information processing device to select at least one of the one or more of the other information processing devices displayed as a candidate for remote connection; and
remotely connect the at least one reference information processing device to the selected at least one of the one or more of the other information processing devices.

10. A control method of an information processing device capable of remote sharing with one or more a plurality of other information processing devices, the information processing device acting as a reference information processing device, the control method comprising:
acquiring device management information of the one or more of the other information processing devices, the device management information of the one or more of the other processing devices include participant information;
comparing device management information of the reference information processing device with the device management information of the one or more of the other information processing devices;
displaying one or more of the other information processing devices as a candidate for remote connection when the comparing determines that the participant information of the device management information of the reference information processing device corresponds to the participant information of the device management information of the one or more of the other information processing devices;
prompting a user of the reference information processing device to select at least one of the one or more of the other information processing devices displayed as a candidate for remote connection;
remotely connecting the reference information processing device to the selected at least one of the one or more of the other information processing devices.

11. The information processing system according to claim 9, wherein the processors are configured to:
display, to the user of the reference information processing device, a screen indicating the one or more of the other information processing devices determined as a candidate for remote connection.

12. The method according to claim 10, further comprising:
displaying, to the user of the reference information processing device, a screen indicating the one or more of the other information processing devices determined as a candidate for remote connection.

* * * * *